(12) United States Patent
Kurata et al.

(10) Patent No.: US 7,079,245 B2
(45) Date of Patent: Jul. 18, 2006

(54) METHOD AND APPARATUS FOR DETECTING GAP OF LIQUID-CRYSTAL PANEL AND APPARATUS THEREFOR

(75) Inventors: Tetsuyuki Kurata, Hyogo (JP); Tetsuya Satake, Hyogo (JP); Takahiro Nishioka, Hyogo (JP); Yoshihiro Togashi, Aichi (JP); Toshiaki Maehara, Aichi (JP); Susumu Sato, Akita (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 622 days.

(21) Appl. No.: 10/016,913

(22) Filed: Dec. 14, 2001

(65) Prior Publication Data

US 2004/0021863 A1 Feb. 5, 2004

(30) Foreign Application Priority Data

Dec. 14, 2000 (JP) ............................. 2000-380907

(51) Int. Cl.
*G01J 4/00* (2006.01)
*H01L 27/00* (2006.01)
*G02B 27/28* (2006.01)

(52) U.S. Cl. .................. 356/364; 356/367; 250/208.1; 359/489

(58) Field of Classification Search ........ 356/364–370, 356/630; 250/208.1, 201.3, 201.5, 234, 225; 359/375, 438–484, 386, 489
See application file for complete search history.

(56) References Cited

U.S. PATENT DOCUMENTS

| | | | | |
|---|---|---|---|---|
| 4,286,843 A | * | 9/1981 | Reytblatt | .................... 359/489 |
| 5,118,191 A | * | 6/1992 | Hopkins | ..................... 356/368 |
| 5,298,972 A | | 3/1994 | Heffner | |
| 5,365,067 A | * | 11/1994 | Cole et al. | ................ 250/341.8 |
| 5,450,201 A | * | 9/1995 | Katzir et al. | ................. 356/369 |
| 5,532,823 A | | 7/1996 | Fukui et al. | |
| 5,638,207 A | * | 6/1997 | Fukuzawa et al. | .......... 359/375 |
| 5,764,363 A | * | 6/1998 | Ooki et al. | .................. 356/364 |

(Continued)

OTHER PUBLICATIONS

Choi, Wing-Kit, *P-85: Reflective Liquid-Crystal Cell-Gap Measurement Using Input-Polarization-Angle Dependence*, SID 02 Digest, Copyright 2002 SID, pp. 530-533.

(Continued)

*Primary Examiner*—Gregory J. Toatley, Jr.
*Assistant Examiner*—Sang H. Nguyen
(74) *Attorney, Agent, or Firm*—Patterson, Thuente, Skaar & Christensen, P.A.

(57) ABSTRACT

Light from a light source 10 is linearly polarized by a polarizer 11. Then it propagates via a half-mirror 12 almost parallel to the normal to a reflective liquid-crystal panel 13 and falls on the reflective liquid-crystal panel 13. The reflected light reflected by the reflective liquid-crystal panel 13 is received by a detector 15 via the half-mirror 12 and an analyzer 14. In this state, the reflective liquid-crystal panel 13 is rotated about an axis almost parallel to the normal to the reflective liquid-crystal panel 13 and an angle (extinction angle) at which the output signal of detector 15 reaches minimum is measured. Then, the gap of the reflective liquid-crystal panel 13 is detected based on the measured extinction angle. It is also possible to measure the output signals of detector 15 by arranging the analyzer 14 in a state in which the transmission axis thereof is almost parallel to the polarization direction of the incident light and a state in which it is almost perpendicular thereto and to detect the gap of the reflective liquid-crystal panel 13 based on the measured signals.

19 Claims, 7 Drawing Sheets

U.S. PATENT DOCUMENTS

| | | | |
|---|---|---|---|
| 5,966,195 | A | 10/1999 | Sato et al. |
| 6,081,337 | A * | 6/2000 | Kwok et al. ............... 356/601 |
| 6,275,291 | B1 * | 8/2001 | Abraham et al. ........... 356/367 |
| 6,369,375 | B1 * | 4/2002 | Ishiwata .................. 250/208.1 |
| 6,538,754 | B1 * | 3/2003 | Choi .......................... 356/630 |
| 6,639,674 | B1 * | 10/2003 | Sokolov et al. ............. 356/369 |
| 6,724,215 | B1 * | 4/2004 | Kuroiwa ..................... 324/770 |
| 6,822,737 | B1 * | 11/2004 | Kurata et al. ............... 356/364 |
| 2001/0048528 | A1 | 12/2001 | Choi |

OTHER PUBLICATIONS

Stallinga, S., *Equivalent Retarder Approach To Reflective Liquid Crystal Displays*, Journal of Applied Physics, vol. 86, No. 9, Dated Nov. 1, 1999, pp. 4756-4766.

Tang, S.T., and Kwok, H. S., *3×3 Matrix for Unitary Optical Systems*, J. Opt. Soc. Am.A/vol. 18, No. 9, Sep. 2001, pp. 2138-2145.

Tang, S.T., and Kwok, H.S., *Measurement of Reflective LCD Cell Gap*, XP009042601, LCTp2-4, Dated 2000, pp. 109-111.

Tang, S.T., and Kwok, H.S., *Measurement of Reflective Liquid Crystal Displays*, Journal of Applied Physics, vol. 91, No. 11, Dated Jun. 1, 2002, pp. 8950-8954.

Wu, Shin-Tson, and Xu, Gang, *Cell Gap and Twist Angle Determinations of a Reflective Liquid Crystal Display*, IEEE Transactions on Electron Devices, vol. 47, No. 12, Dated Dec. 2000, pp. 2290-2293.

\* cited by examiner

METHOD AND APPARATUS FOR DETECTING GAP OF LIQUID-CRYSTAL PANEL AND APPARATUS THEREFOR

BACKGROUND OF THE INVENTION

1. Field of the Invention

The present invention relates to a method and apparatus for detecting the gap of a liquid-crystal panel, in particular, a reflective liquid-crystal panel.

2. Description of the Related Art

Liquid-crystal panels feature small weight and thickness and a low power consumption. For this reason, liquid-crystal panels have been widely used in monitors, displays, and the like. In particular, reflective liquid-crystal panels having a reflective mirror on one substrate use light illuminating the liquid-crystal panel from the outside as an illumination light source and, therefore, require no light source unit. For this reason, reflective liquid-crystal panels have been used as displays for portable information terminals or cellular phones which have an especially low power consumption.

In the reflective liquid-crystal panels that are presently used, liquid crystal molecules are oriented almost parallel on both substrates, but the orientation direction of liquid crystal molecules between the substrates is twisted. Furthermore, even among the reflective liquid-crystal panels of a type in which the orientation direction of liquid crystal molecules between the substrates is twisted, the reflective super twisted nematic liquid-crystal panels (reflective STN liquid-crystal panels) or reflective twisted nematic liquid-crystal panels (reflective TN liquid-crystal panels) are mainly used. In the reflective STN liquid-crystal panels, the twisting angle of orientation direction of liquid crystal molecules is no less than about 180°. In the reflective TN liquid-crystal panels this angle is no more than about 120°. A general name of reflective liquid-crystal panels will be given hereinbelow to the reflective STN liquid-crystal panels and reflective TN liquid-crystal panels.

The display performance of reflective liquid-crystal panels depends of the gap between the substrates, refractive index of liquid crystals, twisting angle of orientation, pretilt angle (angle at which the liquid crystal molecules rise with respect to the flat surface of substrates), and the like. The control of gap is especially important in the manufacture of reflective liquid-crystal panels. Such a control is not limited to reflective liquid-crystal panels and is also important in the manufacture of transmission liquid-crystal panels. In the transmission liquid-crystal panels, illumination with light from a light source is conducted from the rear surface of the liquid-crystal panel.

Various methods have been used for detecting the gap of reflective liquid-crystal panels.

For example, a method was suggested for determining the gap from the pattern of interference stripes observed in the reflection spectrum in a near-IR region (Japanese Liquid Crystal Society, Preprints of Reports presented at the 2000 Meeting, PCb03, p. 341).

However, the method for detecting the gap of liquid-crystal panels from the pattern of interference stripes does not take into account the presence of a large number of interfaces making contribution to the interference, the necessity of refractive index dispersion in the liquid crystal with respect to light in the near-red range, and a twisted orientation of liquid crystal molecules. For this reason, the calibration curve (a curve representing the relationship for correcting the numerical values obtained by measurements to actual gap values) has to be plotted.

Furthermore, an attempt was also made to detect the gap of liquid-crystal panels form the retardation $\Delta nd$ ($\Delta n$ is the refractive index anisotropy of a liquid-crystal and d is the thickness of a liquid-crystal layer).

However, under the orientation conditions of liquid crystal employed in the reflective TN liquid-crystal panels, the retardation is constant, regardless of the gap. For this reason, a method for detecting the gap of liquid-crystal panels from the retardation is difficult to use for detecting the gap of reflective TN liquid-crystal panels.

The conventional methods employed complex apparatus and involved troublesome operations or processing. In particular, the detection time was long.

SUMMARY OF THE INVENTION

It is a first object of the present invention to disclose a method for detecting the gap of a liquid-crystal panel which has a simple structure and makes it possible to detect the gap (thickness of liquid-crystal layer) in a liquid-crystal panel within a short time.

In the preferred embodiment of the method for detecting the gap of a liquid-crystal panel in accordance with the present invention, an extinction angle at which the intensity of reflected light reaches minimum is detected in a cross Nicol state (a state in which the polarization direction of the incident light is perpendicular to the transmission axis direction of the analyzer) of the analyzer provided on the reflected light side, and the gap of liquid-crystal panels is detected based on the detected extinction angle. In this embodiment, the gap of a liquid-crystal panel can be detected with a high accuracy by a simple method comprising the steps of arranging an analyzer provided on the reflected light side in the cross Nicol state and detecting the extinction angle.

In another preferred embodiment of the method for detecting the gap of a liquid-crystal panel in accordance with the present invention, an analyzer provided on the reflected light side is arrange in a parallel Nicol state (a state in which the polarization direction of the incident light is parallel to the transmission axis direction of the analyzer) and the cross Nicol state, and the gap of a liquid-crystal panel is detected based on the output signals of the detector detecting the quantity of light that passed through the analyzer. In this embodiment, the gap of a liquid-crystal panel can be detected with a high accuracy by a simple method of measuring the output signals of the detector in the parallel Nicol state and cross Nicol state.

With such a method, the gap of a liquid-crystal panel is sometimes difficult to detect only from the output signals of the detector obtained when the analyzer is arranged in the parallel Nicol state and cross Nicol state. For this reason, it is preferred that the gap of a liquid-crystal panel be detected based on the output signals of the detector in each of the following states of the analyzer: parallel Nicol state, cross Nicol state, and a state in which the transmission axis of the analyzer is located on a bisector of the direction almost parallel to the polarization direction of the incident light and the direction almost perpendicular thereto. As a result, the gap of a liquid-crystal panel can be reliably detected even in the case when the gap of a liquid-crystal panel is difficult to detect only from the output signals of the detector obtained when the analyzer is arranged in the parallel Nicol state and cross Nicol state.

The quantity of light received in the parallel Nicol state and cross Nicol state can be also detected simultaneously. For example, the reflected light from the liquid-crystal panel is received by a polarization beam splitter, and the light having a polarization direction almost parallel to the polarization direction of the incident light and the light having a polarization direction almost perpendicular to the polarization direction of the incident light are separated. Then, the quantity of light having a polarization direction almost parallel to the polarization direction of the incident light is detected with the first received light quantity detection device, the quantity of light having a polarization direction almost perpendicular to the polarization direction of the incident light is detected with the second received light quantity detection device, and the gap of the light-crystal panel is detected based on the detection signals of the first received light quantity detection device and second received light quantity detection device.

Furthermore, when the noise light quantity contained in the output signal of the detector is large, the detection accuracy of the gap of a light-crystal panel decreases. Therefore, it is preferred that the noise light quantity be taken into account.

In still another preferred embodiment of the present invention, the noise light quantity is removed by the output signals of the detector in a plurality of rotation positions obtained by rotation about the axis almost parallel to the direction of incidence of the incident light on the liquid-crystal panel. In this embodiment, the output signals from the detector at the time when the analyzer is arranged in the parallel Nicol state and cross Nicol state are measured in a plurality (preferably, no less than three) different rotation positions obtained by rotation about the axis almost parallel to the direction of incidence of the incident light on the liquid-crystal panel. Then, the gap of the light-crystal panel is detected based on the output signals measured in each rotation position.

In yet another embodiment of the present invention, the noise light quantity is removed by the detection signal from the detector in a single rotation position. In this embodiment, the analyzer is arranged in the parallel Nicol state and the output signal from the detector which indicates the noise light quantity containing the surface reflected light as the main component is measured. Then, the analyzer is arranged in a cross Nicol state and the output signal from the detector which indicates the noise light quantity containing the external light as the main component is measured. In this embodiment, the noise light quantity can be removed by the output signal from the detector in a single rotation position. Therefore, the operations are simple.

Another object of the present invention is to disclose an apparatus for detecting the gap of a liquid-crystal panel which has a simple structure and makes it possible to detect the gap (thickness of a liquid-crystal layer) in a liquid-crystal panel within a short time.

The apparatus for detecting the gap of a liquid-crystal panel of the preferred embodiment of the present invention comprises an emission device directing an incident light onto the liquid-crystal panel, an analyzer which receives the reflected light from the liquid-crystal panel and is disposed so that the transmission axis of the analyzer is almost perpendicular to the polarization direction of the incident light, a received light quantity detection device which receives the light that passed through the analyzer, and a processing device. The processing device rotates the direction of incidence of the incident light on the liquid-crystal panel with respect to the transmission axis direction of the analyzer, detects the extinction angle at which the intensity of light detected by the received light quantity detection device reaches minimum, and detects the gap of the liquid-crystal panel based on the detected extinction angle.

The apparatus for detecting the gap of a liquid-crystal panel of another preferred embodiment of the present invention comprises an emission device directing an incident light upon the liquid-crystal panel, an analyzer which receives the reflected light from the liquid-crystal panel, a received light quantity detection device which receives the light that passed through the analyzer, and a processing device. The processing device detects the gap in the liquid-crystal panel based on the first received light quantity obtained in a case when the transmission axis of the analyzer is almost parallel to the polarization direction of the incident light (parallel Nicol state) and the second received light quantity obtained in a case when the transmission axis of the analyzer is almost perpendicular to the polarization direction of the incident light (cross Nicol state). As a result, the gap of the liquid-crystal panel can be detected with a high accuracy by simple processing comprising measuring the first received light quantity and second received light quantity when the analyzer is arranged in the parallel Nicol state and cross Nicol state.

In still another preferred embodiment of the apparatus for detecting the gap of a liquid-crystal panel of the present invention, the reflected light from the liquid-crystal panel is received with a polarization beam splitter and separated into the light having a polarization direction almost parallel to the polarization direction of the incident light and the light having a polarization direction almost perpendicular to the polarization direction of the incident light. Furthermore, the quantity of light having the polarization direction almost parallel to the polarization direction of the incident light, this light coming from the polarization beam splitter, is detected with the first received light quantity detection device, and the quantity of light having the polarization direction almost perpendicular to the polarization direction of the incident light, this light coming from the polarization beam splitter, is detected with the second received light quantity detection device. The processing device detects the gap of the liquid-crystal panel based on the detected signals of the first received light quantity detection device and second received light quantity detection device. In this embodiment, the quantity of received light in the parallel Nicol state and the quantity of received light in the cross Nicol state can be detected at the same time.

In still another preferred embodiment of the apparatus for detecting the gap of a liquid-crystal panel of the present invention, the processing device detects the gap of a liquid-crystal panel based on the first received light quantity, second received light quantity, and third received light quantity obtained in a case when the transmission axis of the analyzer is located on a bisector of the direction almost parallel to the polarization direction of the incident light and the direction almost perpendicular thereto. As a result, the gap of a liquid-crystal panel can be detected with higher reliability than in the case when it is detected based only on the first and second received light quantity.

A surface-type imaging element can be used as the received light quantity detection device in the above-described gap detection apparatuses. As a result, a two-dimensional distribution of gaps of a liquid-crystal panel can be easily detected.

A received light quantity detection device or an emission device having a wavelength selection function can be used as the above-mentioned received light quantity detection device or emission device in the above-described gap detection apparatuses. As a result, the gap of pixels of various colors in a liquid-crystal panel can be detected.

The present invention will become apparent from the reading of the description of the preferred embodiments presented hereinbelow, with reference with the drawings attached, or from the reading of the claims.

DESCRIPTION OF THE PREFERRED EMBODIMENTS

Figure 1:
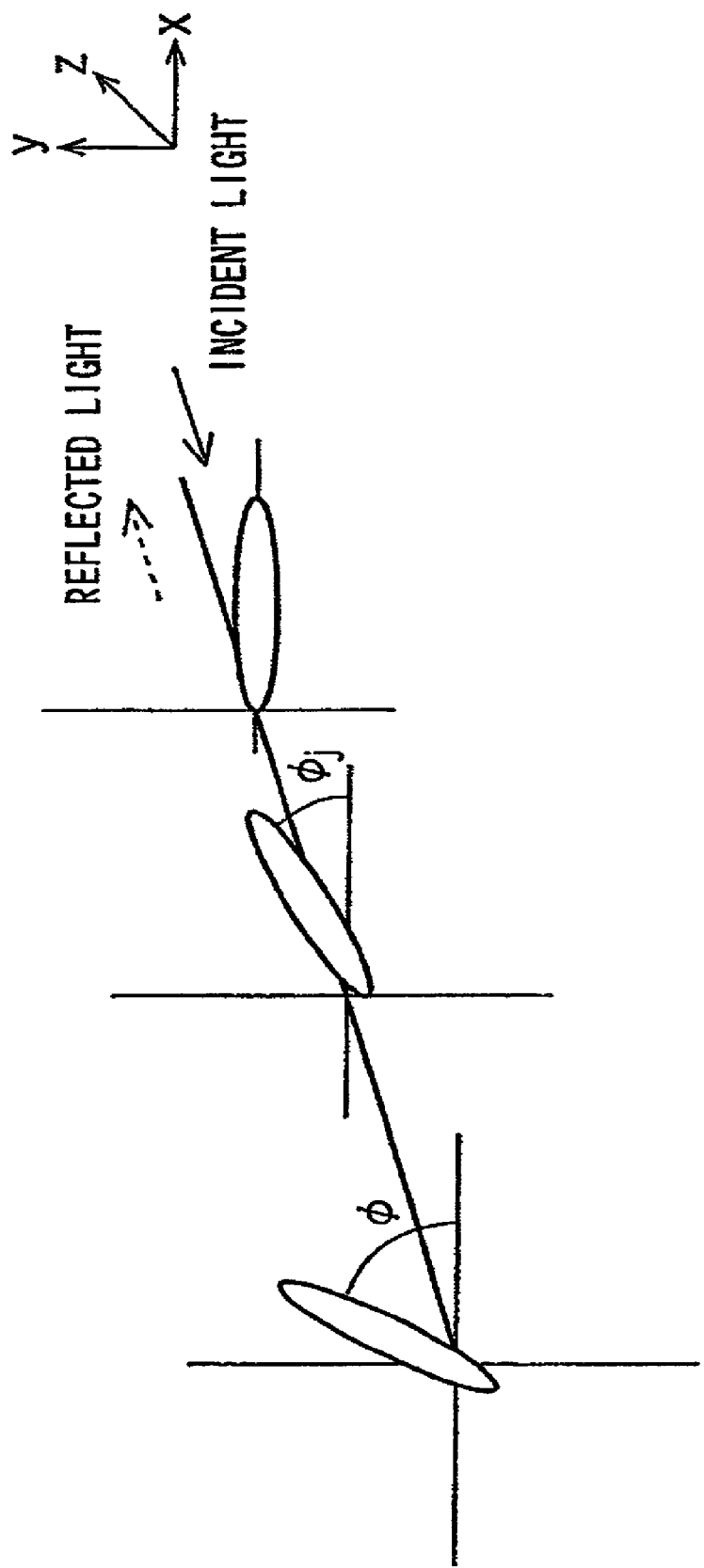
FIG. 1 is a schematic diagram illustrating the system of coordinates and orientation of liquid crystal molecule.

In prior art, for example, a method for detecting the gap of a liquid-crystal panel from the retardation has been known. However, the gap of a reflective liquid-crystal panel (including a transmission liquid-crystal panel provided with reflective parts) is difficult to detect by this method. Furthermore, other methods required expensive devices or complex processing.

It is an object of the present invention to provide a method for detecting the gap of a liquid-crystal panel which has a simple structure and can detect the gap of a liquid-crystal panel, in particular, a reflective liquid-crystal panel, within a short time, and an apparatus therefor.

In one embodiment of the method for detecting the gap of a liquid-crystal panel in accordance with the present invention, (1) a polarized incident light is directed toward the liquid-crystal panel and the reflected light from the liquid-crystal panel is received with a received light quantity detection device via an analyzer having a transmission axis almost perpendicular to the polarization direction of the incident light, (2) the polarization direction of the incident light is rotated about the normal to the liquid-crystal panel surface as a central axis and the extinction angle is detected at which the intensity of the light detected by the received light quantity detection device reaches minimum, and (3) the gap of the liquid-crystal panel is detected based on the detected extinction angle. A method in which a liquid-crystal panel is rotated and a method in which a polarizer and an analyzer are rotated can be used as methods for rotating the direction of polarization of the incident light with respect to the panel. In this embodiment, the method is simple and inexpensive because it is suffice to detect the extinction angle in a state in which the direction of the transmission axis of the analyzer provided on the reflected light side and the polarization direction of the incident light are perpendicular to each other.

In other embodiments of the method for detecting the gap of a liquid-crystal panel in accordance with the present invention, (1) a polarized incident light is directed toward the liquid-crystal panel and the reflected light from the liquid-crystal panel is received with a received light quantity detection device via an analyzer, (2) the first received light quantity is detected in a state in which the transmission axis of the analyzer is arranged so as to be almost parallel to the polarization direction of the incident light (the parallel Nicol state), (3) the second received light quantity is detected in a state in which the transmission axis of the analyzer is arranged so as to be almost perpendicular to the polarization direction of the incident light (cross Nicol state), and (4) the gap of the liquid-crystal panel is deteted based on the first and second received light quantity. In this embodiment, the method is simple and inexpensive because it is suffice to detect the output signal of the received light quantity detection device in the parallel Nicol state and cross Nicol state.

The received light quantity in the parallel Nicol state and the received light quantity in the cross Nicol state can be also detected simultaneously. For example, the light having the polarization direction almost parallel to the polarization direction of the incident light and the light having the polarization direction almost perpendicular to the polarization direction of the incident light are separated from the reflected light. Then, the quantity of each separated light is detected with different detectors and the gap of the liquid-crystal panel is detected based on the detection signals of each detector. As a result, the operation of changing the arrangement of the analyzer and the like becomes unnecessary. Therefore, the gap of the liquid-crystal panel can be detected in a simple manner within a short time.

Sometimes the gap of the liquid-crystal panel cannot be accurately detected by only the output signal of the received light quantity detection device in the parallel Nicol state and cross Nicol state. In such cases, the third received light quantity is additionally detected, this light quantity relating to a case when the transmission axis of the analyzer is positioned on a bisector of the direction almost parallel to the polarization direction of the incident light and the direction almost perpendicular thereto, and the gap of the liquid-crystal panel is detected based on the first, second, and third received light quantity. In this embodiment, a true gap can be distinguished even when a plurality of gaps is detected from only the first and second received light quantity.

When the quantity of light is measured with a received light quantity detection device, the output signal from the received light quantity detection device contains a noise light quantity. If the noise light quantity contained in the output signal from the received light quantity detector is large, the detection accuracy of the gap of a liquid-crystal panel is decreased. For this reason, it is preferred that the gap of the liquid-crystal panel be detected by taking the noise light quantity into account.

With a preferred method for detecting the gap of a liquid-crystal panel which takes the noise light quantity into account, the gap of the liquid-crystal panel is detected based on the output signals from a received light quantity detection device obtained in a plurality of positions of the detection device rotated about the axis almost parallel to the direction of incidence of the incident light on the liquid-crystal panel as a rotation center. The number of rotation positions in which the output signals from the received light quantity detection device are measured is preferably no less than three. Furthermore, it is preferred that the rotation positions be spaced by no less than 5°. The gap of the liquid-crystal panel can be detected, for example, by fitting the output signals from the received light quantity detection device in each rotation position.

With another preferred method for detecting the gap of a liquid-crystal panel which takes the noise light quantity into account, the quantity of the incident light, the noise light quantity, the transmissivity of the half-mirror, and the like are determined in advance. With such a method, the gap of a liquid-crystal panel can be detected based on the output signal from the received light quantity detection device in one rotation position.

The noise light quantity, the transmissivity of the half-mirror, and the like can be determined, for example, based on the output signals from the received light quantity detection device measured in different rotation positions for a plurality of liquid-crystal panels with different gaps.

The noise light quantity can be also determined based on the output signal from the received light quantity detection device in one rotation position. For example, an output signal from the received light quantity detection device representing the noise light quantity containing the surface reflected light as the main component is measured in a parallel Nicol state. Then, an output signal from the received light quantity detection device representing the noise light quantity containing the external light as the main component is measured in a cross Nicol state.

An apparatus for detecting the gap of a liquid-crystal panel which is an embodiment of the present invention comprises an emission device directing a polarized incident light onto the liquid-crystal panel, an analyzer receiving the reflected light and disposed so that the transmission axis thereof is almost perpendicular to the polarization direction of the incident light, a received light quantity detection device which receives the light that passed through the analyzer, and a processing device. The processing device rotates the polarization direction of the incident light about the normal to the liquid-crystal panel surface as a central axis, detects the extinction angle at which the received light quantity reaches minimum, and determines the gap of the liquid-crystal panel based on the detected extinction angle. The extinction angle may be detected by rotating the liquid-crystal panel or by rotating the polarizer and analyzer.

An apparatus for detecting the gap of a liquid-crystal panel which is another embodiment of the present invention comprises an emission device directing a polarized incident light onto the liquid-crystal panel, an analyzer receiving the reflected light, a received light quantity detection device which receives the light that passed through the analyzer, and a processing device. The processing device detects the gap of the liquid-crystal panel based on the output signals from the received light quantity detection device in the parallel Nicol state and cross Nicol state.

An apparatus for detecting the gap of a liquid-crystal panel which is another embodiment of the present invention comprises an emission device directing a polarized incident light onto the liquid-crystal panel, a polarization beam splitter receiving the reflected light from the liquid-crystal panel, a plurality of received light quantity detection devices, and a processing device. The polarization beam splitter receives the reflected light and separates it into the light having a polarization direction almost parallel to the polarization direction of the incident light and the light having a polarization direction almost perpendicular to the polarization direction of the incident light. The received light quantity detection devices detect the quantity of light separated by the polarization beam splitter. The detection signals of the detectors correspond to the received light quantity in the parallel Nicol state and the received light quantity in the cross Nicol state. The processing device detects the gap of the liquid-crystal panel based on the detection signals of the received light quantity detectors.

In the apparatus for detecting the gap of a liquid-crystal panel which is another embodiment of the present invention, the processing apparatus detects the gap of the liquid-crystal panel based on the output signals from the received light quantity detection devices obtained when the analyzer is in the parallel Nicol state and cross Nicol state and when the analyzer is disposed so that the transmission axis thereof is located on a bisector of the direction almost parallel to the polarization direction of the incident light and the direction almost perpendicular thereto.

In the apparatus for detecting the gap of a liquid-crystal panel which is another embodiment of the present invention, the processing apparatus detects the gap of the liquid-crystal panel based on the output signals from the received light quantity detection device in the parallel Nicol state and cross Nicol state in a plurality of different rotation positions about the axis almost parallel to the direction of incidence of the incident light onto the liquid-crystal panel as the rotation center.

In the apparatus for detecting the gap of a liquid-crystal panel which is another embodiment of the present invention, the processing apparatus determines the noise light quantity based on the output signals of the received light quantity detection device in a single rotation position. In this case, the quantity of the incident light, the noise liquid quantity, the transmissivity of the half-mirror, and the like are determined in advance.

The specific features of the present invention will be described below in greater detail with reference to the attached drawings. This detailed description of the present invention is provided for the purpose of implementation thereof by those skilled in the art and places no limitation on the scope of the present invention.

The embodiments of the present invention will be described below.

The explanation hereinbelow will be conducted with respect to a case of detecting the gap (thickness) of a reflective liquid-crystal panel (reflective TN liquid-crystal panel, reflective STN liquid-crystal panel, and the like) in which the liquid crystal molecules are oriented almost parallel at both substrates, the orientation direction of liquid crystal molecules between the substrates is twisted, and a reflective mirror or a reflective component having a light reflection function is provided on one of the substrates. However, the present invention can be also applied to detecting the gap (thickness) of a transmission liquid-crystal panel (transmission TC liquid-crystal panel, transmission STN liquid-crystal panel, and the like) in which no reflective component is provided. When the method or apparatus in accordance with the present invention is used to detect the gap of the transmission liquid-crystal panel, a reflective component such as a reflective mirror may be separately disposed almost parallel to the substrate flat surface on one surface of the transmission liquid-crystal panel. The reflective liquid-crystal panels described in the present specification also include the transmission liquid-crystal panel with a separately installed reflective component.

The polarization state of light can be represented by the electric field vector E of light. When the polarization state of light is represented by the electric field vector of light, changes in the polarization state of light occurring when the light passes through a liquid-crystal layer can be represented by a 2×2 matrix (Jones matrix).

Here, let us consider a liquid-crystal layer divided into N extremely thin layers. If the polarization direction of liquid crystal molecules in each thin layer is assumed to be constant (azimuth $\phi_j$ [rad], tilt angle $\theta$[rad]), the thin layer can be considered as an optically uniaxial medium. The thin layer will be arranged as shown in FIG. 1 with respect to an x-y-z system of coordinates. In FIG. 1, the z axis is set in the direction of incident light and the x axis and y axis are set perpendicular thereto.

In FIG. 1, the light is incident from the liquid-crystal layer side, reflected by the reflective mirror, again passes through the liquid-crystal layer, and outgoes as a reflected light. Here, it is assumed that the light is incident perpendicular to the reflective liquid-crystal panel (parallel to the normal to the liquid-crystal panel) and the reflected light is reflected perpendicular to the reflective liquid-crystal panel. However, in actual measurements, the direction of light incidence within 20°, preferably, within 10° with respect to the normal to the liquid-crystal panel would suffice.

The Jones matrix $W_j$ of an j-th thin layer relating to the incident light can be represented by (Equation 1). Here, $\lambda$ [μm] is the light wavelength. $\phi$ [rad] is the twisting angle of the liquid crystal (difference in azimuths of liquid crystal molecules at both substrates). $n_o$ is the refractive index of a liquid-crystal material with respect to an ordinary light (light having a polarization plane perpendicular to the long axis of liquid crystal molecules). $n_e$ is the refractive index of a liquid-crystal material with respect to an extraordinary light (light having a polarization plane parallel to the long axis of liquid crystal molecules). d [μm] is the gap (thickness) of the liquid-crystal layer. Furthermore, $\pi$ is the ratio of the circumference of a circle to its diameter, i is an imaginary unit.

$$W_j = \begin{pmatrix} \cos\frac{\beta}{N} - i\cdot\cos 2\phi_j \cdot \sin\frac{\beta}{N} & -i\cdot\sin 2\phi_j \cdot \sin\frac{\beta}{N} \\ -i\cdot\sin 2\phi_j \cdot \sin\frac{\beta}{N} & \cos\frac{\beta}{N} + i\cdot\cos 2\phi_j \cdot \sin\frac{\beta}{N} \end{pmatrix} \quad \text{(Equation 1)}$$

$$\beta = \frac{\pi \cdot \Delta n \cdot d}{\lambda}$$

$$\Delta n = \frac{n_e \cdot n_o}{\sqrt{n_o^2 + (n_e^2 - n_o^2)\sin^2\theta}} - n_o$$

Similarly, the Jones matrix $W_j^{ref}$ of the j-th thin layer relating to the reflected light can be represented by (Equation 2).

$$W_j^{ref} = W_j(-\phi_j) = \quad \text{(Equation 2)}$$

$$= \begin{pmatrix} \cos\frac{\beta}{N} - i\cdot\cos 2\phi_j \cdot \sin\frac{\beta}{N} & i\cdot\sin 2\phi_j \cdot \sin\frac{\beta}{N} \\ i\cdot\sin 2\phi_j \cdot \sin\frac{\beta}{N} & \cos\frac{\beta}{N} + i\cdot\cos 2\phi_j \cdot \sin\frac{\beta}{N} \end{pmatrix}$$

Similarly, the Jones matrix of the reflective mirror can be represented by (Equation 3).

$$M = \begin{pmatrix} -1 & 0 \\ 0 & 1 \end{pmatrix} \quad \text{(Equation 3)}$$

From those equations, the Jones matrix W of the entire reflective liquid-crystal panel including the reflective mirror can be represented by (Equation 4).

$$W = \lim_{N\to\infty} \left[ W_1^{ref} W_2^{ref} \cdots W_N^{ref} M W_N \cdots W_2 W_1 \right] \quad \text{(Equation 4)}$$

Here, the following relationship represented by (Equation 5) is valid between the Jones matrix M of the reflective mirror, Jones matrix $W_j$ of a thin layer relating to the incident light, and Jones matrix $W_j^{ref}$ of a thin layer relating to the reflective light.

$$MW_j = W_j^{ref} M \quad \text{(Equation 5)}$$

Therefore, (Equation 4) can be represented as (Equation 6).

$$W = MT(-\Phi)T(\Phi) \quad \text{(Equation 6)}$$

$$T(\Phi) = \lim_{N\to\infty} W_N \cdots W_2 W_1$$

$$T(-\phi)T(\phi) = \begin{pmatrix} \cos^2 X + (\Phi^2 - \beta^2)\frac{\sin^2 X}{X^2} - 2i\beta\frac{\sin X \cos X}{X} & -2i\beta\phi\frac{\sin^2 X}{X^2} \\ -2i\beta\phi\frac{\sin^2 X}{X^2} & \cos^2 X + (\Phi^2 - \beta^2)\frac{\sin^2 X}{X^2} - 2i\beta\frac{\sin X \cos X}{X} \end{pmatrix}$$

$$X = \sqrt{\phi^2 + \beta^2}$$

[T(-φ)T(φ)] is formally equivalent to (Equation 1) which is the Jones matrix of the uniaxial medium. Therefore, it can be understood that the reflective panel is optically equivalent to a uniaxial medium.

First Embodiment

The first embodiment of the method for detecting the gap of a liquid-crystal panel will be described below.

In a uniaxial medium, the polarization direction of incident light at which the refractive index reaches maximum is called a retarding phase axis and the polarization direction of incident light at which the refractive index reaches minimum is called an advancing phase axis. In the present specification, the directions of projections of those retarding phase axis and advancing phase axis on the substrate plane are referred to as the retarding phase axis direction and the advancing phase axis direction, respectively.

The relationship represented by (Equation 7) is satisfied between $\phi_{app}$, $\Delta n_{eff}d$, and parameters ($\phi$, $\Delta nd$, $\beta$) of a reflective liquid-crystal panel, where the retarding phase axis direction of a uniaxial medium is denoted by $\phi_{app}$ [rad] and the retardation (a product of thickness and refractive index anisotropy of a uniaxial medium) is denoted by $\Delta n_{eff}2d$ [μm] (because of the reciprocal path, the thickness is doubled).

$$\cos\beta_{eff} = \cos^2 X + (\Phi^2 - \beta^2)\frac{\sin^2 X}{X^2} \quad \text{(Equation 7)}$$
$$\cos 2\phi_{app} \cdot \sin\beta_{eff} = 2\beta \frac{\sin X \cdot \cos X}{X}$$
$$\sin 2\phi_{app} \cdot \sin\beta_{eff} = 2\phi\beta \frac{\sin^2 X}{X^2}$$
$$\beta_{eff} = \frac{2\pi \cdot \Delta n_{eff} \cdot d}{\lambda}$$

If the reflective liquid-crystal panel is rotated around the axis almost parallel to the direction of incidence of the incident light in the cross Nicol state (a state in which the transmission axis direction of the analyzer provided on the outgoing light side is perpendicular to the transmission axis direction of the polarizer provided on the incident light side), then the outgoing light will extinct (the reflection factor reaches minimum) at a certain angle. This angle is called an extinction angle and it coincides with a retarding phase axis direction (or advancing phase axis direction perpendicular thereto) of the uniaxial medium.

In other words, if an extinction angle of a reflective liquid-crystal panel is measured from the orientation direction of a liquid crystal at the substrate on the incident light side, the extinction angle will be equal to the retarding phase axis direction $\phi_{app}$ represented by (Equation 7) (or advancing phase axis direction $\phi_{app}=\pi/2$) perpendicular thereto).

Therefore, the gap d of the reflective liquid-crystal panel can be detected by using (Equation 8) derived from (Equation 7)

$$\tan 2\phi_{app} = \tan 2\left(\phi_{app} + \frac{\pi}{2}\right) = \phi \frac{\tan X}{X} \quad \text{(Equation 8)}$$
$$X = \sqrt{\phi^2 + \beta^2} \quad \beta = \frac{\pi \Delta nd}{\lambda}$$

-continued
$$\Delta n = \frac{n_e \cdot n_o}{\sqrt{n_o^2 + (n_e^2 - n_o^2)\sin^2\theta}} - n_o$$

Figure 2:
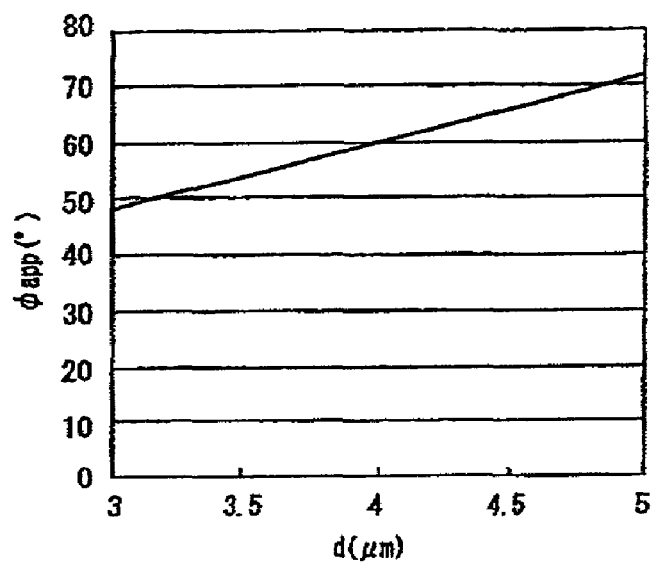
FIG. 2 illustrates the results obtained in calculating the extinction angle from the gap of a liquid-crystal panel.
Figure 3:
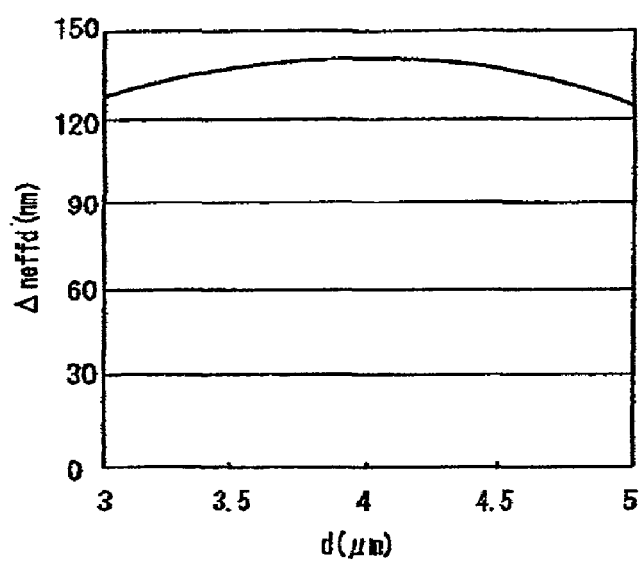
FIG. 3 illustrates the results obtained in calculating the retardation of a liquid-crystal panel from the gap of a liquid-crystal panel.

FIG. 2 and FIG. 3 demonstrate the results obtained in calculating the extinction angle $\phi_{app}$ and retardation $\Delta n_{eff}d$ (calculated at $\Delta n=0.066$) by using (Equation 7) when gap d was changed under conditions close to those under which the reflective TN liquid-crystal panels are used ($\Delta nd=260$ nm, $\phi=70°$).

FIG. 2 shows that the extinction angle $\phi_{app}$ changes almost linearly with respect to gap d, with the sensitivity being as high as about 1°/0.1 μm.

By contacts, FIG. 3 shows that the retardation $\Delta n_{eff}d$ practically does not change, especially, when gap d is close to 4 μm. In other words, it is clear that gap d of a reflective TN liquid-crystal panel is difficult to detect by measuring the retardation.

Figure 4:
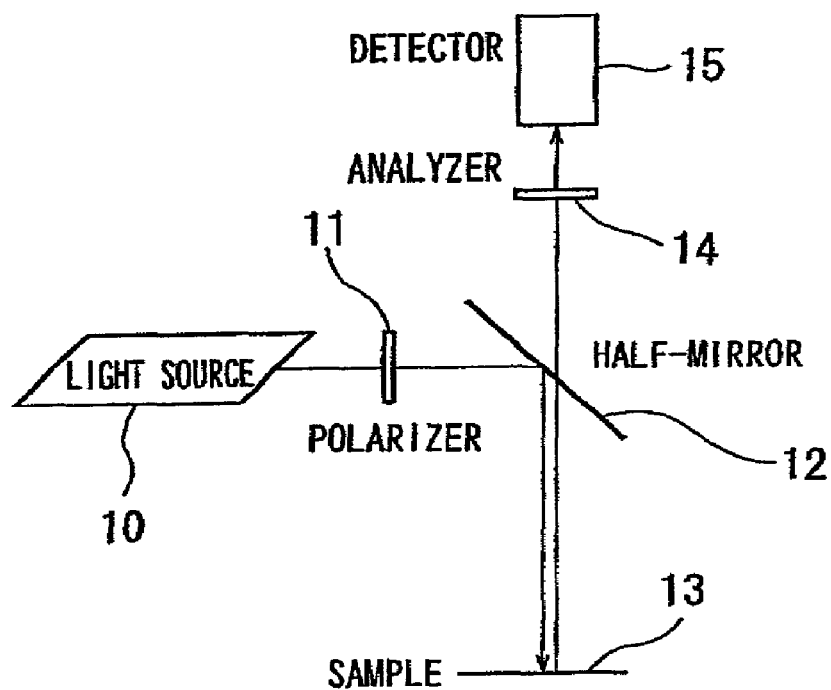
FIG. 4 illustrates an example of the measurement device used in the method for detecting the gap of a liquid-crystal panel in accordance with the present invention.
Figure 5:
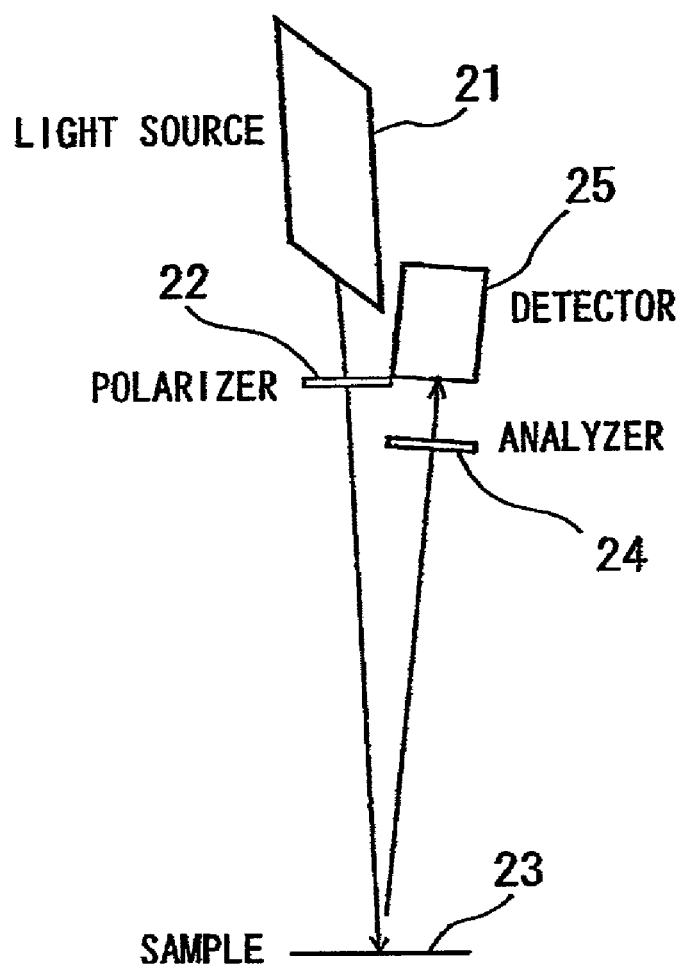
FIG. 5 illustrates another example of the measurement device used in the method for detecting the gap of a liquid-crystal panel in accordance with the present invention.

The extinction angle of a liquid-crystal panel can be measured, for example, with measurement apparatuses shown in FIG. 4 and FIG. 5.

In the measurement apparatus shown in FIG. 4, a half-mirror is used to cause the incident light and reflected light to propagate in the direction almost parallel to the normal to the reflective liquid-crystal panel (sample). Thus, the light from a light source 10 is linearly polarized by a polarizer 11 and then directed onto a half-mirror 12. The light reflected by the half-mirror 12 propagates almost parallel to the normal to a reflective liquid-crystal panel 13 and falls on the reflective liquid-crystal panel 13. The reflected light that was reflected by the reflective liquid-crystal panel 13 is directed to a detector (received light quantity detector) 15 via the half-mirror 12 and analyzer 14.

In the measurement apparatus shown in FIG. 5, the incident light and reflected light are caused to propagate almost parallel to the normal to a reflective liquid-crystal panel (sample) by providing a sufficient distance between the light source and the reflective liquid-crystal panel. Thus, the light from a light source 21 is linearly polarized with a polarizer 22. Then, it propagates almost parallel to the normal to the reflective liquid-crystal panel 23 and falls on the reflective liquid-crystal panel 23. The reflected light that was reflected by the reflective liquid-crystal panel 23 falls on a detector (received light quantity detector) 25 via an analyzer 24.

The angle between the propagation direction of the incident light—reflected light and the normal to the reflective liquid-crystal panel is set to no more than 30°, preferably, no more than 10°.

A monochromatizing means such as a color filter and the like or a spectroscope monochromatizing the light from an emitter may be used in the light source 21. An emitter that emits a monochromatic light, such as a light-emitting diode (LED) or a semiconductor laser, may be also used.

In FIG. 4 and FIG. 5, the light emitting means was constituted by a light source and a polarizer. However, no specific limitation is placed on the structure of the light emitting means. For example, the light emitting means may be also composed of a polarized light source such as a polarization laser and the like. In such a case, the polarizer can be omitted.

Furthermore, it is preferred that an angle detection device be provided for detecting the rotation angle of the polarizer, analyzer, and reflective liquid-crystal panel; such a device is not shown in FIG. 4 and FIG. 5.

Furthermore, a processing device is provided for detecting the extinction angle $\phi_{app}$ from the output signals of the detector and the output signals of the angle detection device, for detecting the gap d of the reflective liquid-crystal panel by the above-described method from the extinction angle $\phi_{app}$, and for outputting the detection results to a display device, printer, recording medium, and the like; the processing device is not shown in FIG. 4 and FIG. 5.

A method for detecting the gap of a liquid-crystal panel by using the preferred embodiment will be described below.

First, the reflective liquid-crystal panels 13, 23 in the measurement apparatuses shown in FIG. 4 and FIG. 5 are rotated about the axis almost parallel to the normal to the reflective liquid-crystal panels 13, 23.

Then, the angle at which the output signals of detectors 15, 25 become minimum (the reflection factor is minimum) is measured and considered as the extinction angle $\phi_{app}$. Then, gap d of reflective liquid-crystal panels 13, 23 is calculated by using the measured extinction angle $\phi_{app}$ and (Equation 8).

With the gap detection method of the first embodiment, the gap of a liquid-crystal panel can be detected with a high accuracy by a very simple method of detecting the extinction angle in the cross Nicol state.

Further, the extinction angle was detected by rotating the reflective liquid-crystal panel. However, the extinction angle may also be measured by rotating the polarizer and analyzer in a state in which the transmission axis direction of the polarizer and the transmission axis direction of the analyzer are made perpendicular to each other.

The polarizer, analyzer and liquid-crystal panel may be rotated manually or with a driving apparatus such as a motor or the like.

Furthermore, when an extinction angle of a liquid-crystal panel equipped with a color filter is detected, there may be pixels which cannot be measured if the light wavelength is fixed. Therefore, it is preferred that either a light source or a detector be provided with a wavelength selection function. In such a case, the light wavelength can be selected according to a pixel color, which makes it possible to detect the gap of pixels of various colors in the liquid-crystal panel.

A surface imaging element such as a CCD camera or the like can be also used as the detector. In such a case, the location where the gap of a liquid-crystal panel is detected can be easily specified. Moreover, a two-dimensional distribution of gaps of a liquid-crystal panel can be easily detected based on the image signal of the surface imaging element.

Second Embodiment

The second embodiment of the method for detecting the gap of a liquid-crystal panel will be described below.

Let us consider a case when a reflective liquid-crystal panel is arranged so that an angle between the orientation direction of a liquid crystal molecule at a substrate on the incident light side and the polarization direction of the incident light is $\alpha^{in}$. The electric field vector $E^{ref}$ of the reflected light at this time can be represented by (Equation 9) from (Equation 6) and (Equation 7).

$$E^{ref} = \begin{pmatrix} E_x \\ E_y \end{pmatrix} = \begin{pmatrix} \cos\beta_{eff} - i \cdot \cos2(\phi_{app} + \alpha^{in})\sin\beta_{eff} \\ -i \cdot \sin2(\phi + \alpha^{in})\sin\beta_{eff} \end{pmatrix} \quad \text{(Equation 9)}$$

It follows herefrom that the reflection factors $R_x$, $R_y$ (the ratio of the quantity of the reflected light from the liquid-crystal panel to the quantity of the incident light) obtained when the analyzer on the reflected light side is arranged in the parallel Nicol state (a state in which the transmission axis direction of the analyzer on the reflected light side is parallel to the transmission axis direction of the polarizer on the incident light side) and cross Nicol state can be represented by (Equation 10).

$$R_x = |E_x|^2 = \cos^2\beta_{eff} + \cos^2 2(\phi_{app} + \alpha^{in}) \cdot \sin^2\beta_{eff}$$

$$R_y = |E_y|^2 = \sin^2 2(\phi_{app} + \alpha^{in}) \cdot \sin^2\beta_{eff} \quad \text{(Equation 10)}$$

Therefore, in the reflective liquid-crystal panel arranged so that the angle between the orientation direction of liquid crystal molecules at the substrate on the incident light side and the polarization direction of the incident light becomes $\alpha^{in}$, the gap d of the reflective liquid-crystal panel can be detected from (Equation 10) by arranging the analyzer in the parallel Nicol state or cross Nicol state and measuring the reflection factors $R_x$, $R_y$.

Reflection factors of a liquid-crystal panel can be measured, for example, with the measurement apparatuses shown in FIG. 4 and FIG. 5.

The method for detecting the gap of a liquid-crystal panel by using the second embodiment will be described below.

First, the transmission axis direction of analyzers 14, 24 in the measurement apparatuses shown in FIG. 4 and FIG. 5 is arranged almost parallel (parallel Nicol) to the polarization direction of the incident light and the output signals (received light quantity) of detectors 15, 25 are measured. Then, the reflection factor $R_x$ is calculated based on the quantity of light emitted from the light sources 10, 21 and the measured output signals of detectors 15, 25.

Then, the transmission axis direction of analyzers 14, 24 is arranged almost perpendicular (cross Nicol) to the polarization direction of the incident light and the output signals (received light quantity) of detectors 15, 25 are measured. The reflection factor $R_y$ is then calculated based on the quantity of light emitted from the light sources 10, 21 and the measured output signals of detectors 15, 25.

Gap d of reflective liquid-crystal panels 13, 23 is then calculated by using the reflection factors $R_x$, $R_y$.

Modifications, additions, and deletions employed with respect to the measurement apparatuses shown in FIG. 4 and FIG. 5 when the gap detection method of the first embodiment was used can be also employed when the gap detection method of the second embodiment is used.

With the gap detection method of the second embodiment, the gap of a liquid-crystal panel can be detected with a high accuracy by a very simple method of detecting the reflection factors in the parallel Nicol state and cross Nicol state.

Furthermore, since it is not necessary to rotate the liquid-crystal panel (sample), the operations of confirming or selecting the site of gap detection can be easily conducted by using a surface-type imaging element such as CCD or the like as a detector.

Moreover, using a surface-type imaging element as a detector makes it possible to detect easily the two-dimensional distribution of the gap of a liquid-crystal panel.

Since reflection factors $R_x$ and $R_y$ satisfy the relationship $[R_x+R_y=1]$, the gap d can be detected by measuring only one of the factors. However, because in real measurements the output signal of the detector contains a noise light quantity, the relationship between the detected $R_x$ and $R_y$ is not necessarily $[R_x+R_y=1]$. For this reason, in order to conduct measurements with good accuracy, it is desired that both reflection factors $R_x$ and $R_y$ be detected.

The following problems are associated with the method for detecting the gap by using (Equation 10).

One of the problems is that it is impossible to distinguish whether $[\sin^2 \beta_{eff}=0]$ (that is, $\Delta n_{eff} d = m \cdot \lambda/2$, m is integer) or $[\sin^2 2(\phi_{app}+\alpha^{in})=0]$ (that is, $\phi_{app}+\alpha^{in}=m \lambda/2$, m is integer) when the reflection factors $R_x=1$, $R_y=0$.

However, when $[\sin^2 \beta_{eff}=0]$, the reflection factors are constantly $R_x=1$, $R_y=0$ despite the rotation of the reflective liquid-crystal panel, whereas when $[\sin^2 2(\phi_{app}+\alpha^{in})=0]$, the reflection factors vary if the reflective liquid-crystal panel is rotated.

Furthermore, it is possible to distinguish whether $[\sin^{2\beta}_{eff}=0]$ or $[\sin^2 2(\phi_{app}+\alpha^{in})=0]$ by rotating the reflective liquid-crystal panel.

Another problem is that a plurality of solutions exist for gap d because (Equation 10) is represented by a trigonometric functions.

Figure 6:
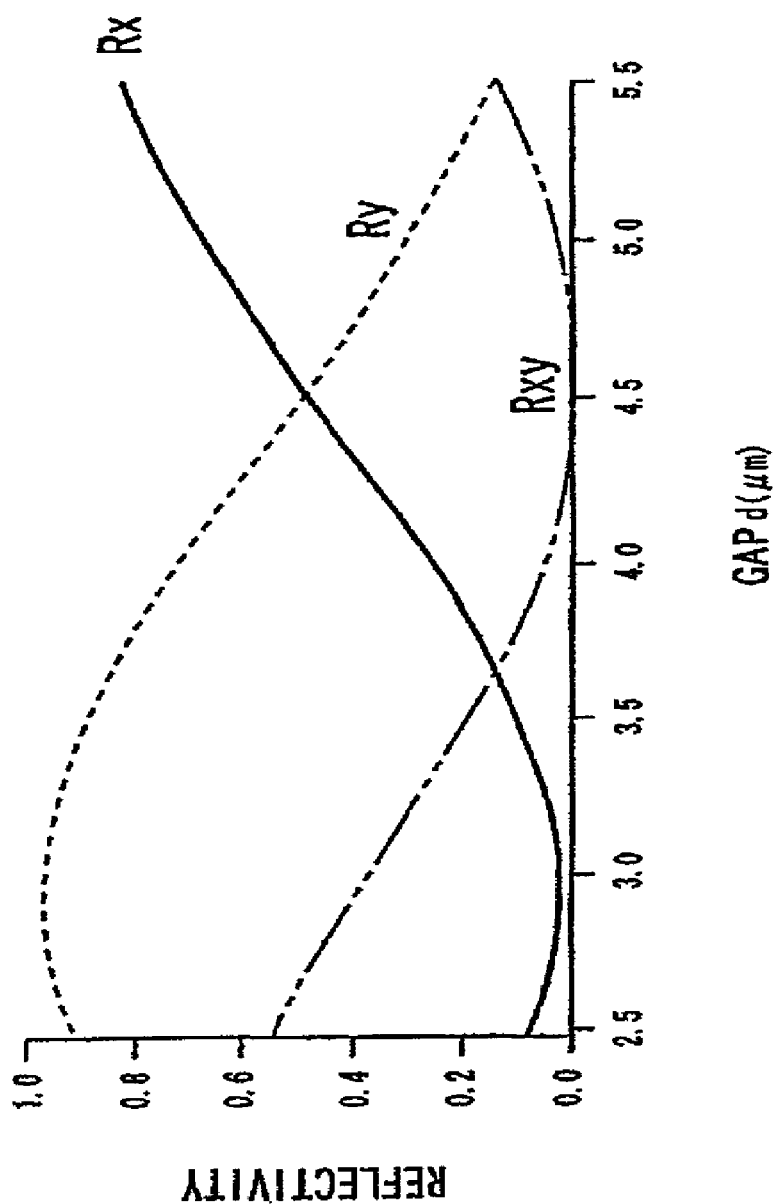
FIG. 6 illustrates the results of calculating the reflectivity in the parallel Nicol state and cross Nicol state.

FIG. 6 shows the results obtained in calculating the reflection factors $R_x$, $R_y$ under the same conditions ($\Delta n=0.066$, $\phi=70°$, $\alpha^{in}=0°$) as those relating to FIG. 2 and FIG. 3.

FIG. 3 shows that the solutions (gaps d) become especially close and are difficult to distinguish one from another when one of the reflection factors $R_x$, $R_y$ is close to 0 and the other is close to 1 (d in FIG. 6 is close to 3 µm).

Though such situations are rare, three methods for resolving the problem are presented below.

With the first resolution method, the reflective liquid-crystal panel (sample) is rotated prior to measurements. As a result, the gap value at which one of the reflection factors $R_x$, $R_y$ becomes close to 0 and the other becomes close to 1 is shifted. Therefore, gap d can be detected accurately. Further, even when this method is used, it is not necessary to rotate the reflective liquid-crystal panel at the time of gap detection.

With the second resolution method, the reflection factor $R_{xy}$ is additionally measured in a state in which the transmission axis direction of the analyzer is disposed on a bisector of the parallel Nicol direction and cross Nicol direction (that is, on the direction at 45° to each of those directions).

Here, the reflection factor $R_{xy}$ can be represented from (Equation 9) as shown by (Equation 11).

$$R_{xy} = \frac{1}{2}|E_x + E_y|^2 = \frac{1}{2}[1 + \sin\beta_{eff} \cdot \sin 4(\phi_{app} + a^{in})] \quad \text{(Equation 11)}$$

The measurements become difficult under a condition of $R_x$ or $R_y$ being close to 0 because two gaps d satisfying this condition are present in a close range (d close to 3 µm in FIG. 6). Under this condition, $R_{xy}$ does not assume extremal values (changes monotonously). Therefore, which of the two gaps d present in a close range is a true value can be decided by measuring $R_{xy}$.

With the third resolution method, the light source or detector is provided with a wavelength selection function and the wavelength of light used for measurements is changed. Since the reflection factors $R_x$, $R_y$ are functions of wavelength, when R=0 at a certain wavelength of light, it is possible to make $R \neq 0$ by changing the light wavelength. Thus, the gap of the liquid-crystal panel can be accurately measured.

Embodiment 3

In the above-presented explanation, a case was considered when the noise light quantity contained in the output signal of the detector (received light quantity detector) was small. However, when the noise light quantity contained in the output signal of the detector is large, the detection accuracy of the gap of reflective liquid-crystal panels decreases. In such a case, the gap of a reflective liquid-crystal panel should be detected by taking into account the noise light quantity contained in the output signal of the detector.

A method for detecting the gap of a reflective liquid-crystal panel by taking into account the noise light quantity will be described hereinbelow.

With the method for detecting the gap of a reflective liquid-crystal panel by taking into account the noise light quantity, which is described below, the gap is detected by measuring the output signals of the detector in the parallel Nicol state and cross Nicol state at a plurality of arrangement angles.

In the measurement apparatus shown in FIG. 4 and FIG. 5, the reflective liquid-crystal panels 13, 23 are arranged so that the angle between the orientation direction of liquid crystal molecules at the substrate on the incident light side and the polarization direction of the incident light becomes an arrangement angle $\alpha^{in}_1$. Then, the transmission axis direction of analyzers 14, 24 is arranged almost parallel to the polarization direction of the incident light (parallel Nicol state), and the output signals $I_{x1}$ (received light quantity) of detectors 15, 25 are measured. Further, the transmission axis direction of analyzers 14, 24 is arranged almost perpendicular to the polarization direction of the incident light (cross Nicol state) and the output signals $I_{y1}$ (received light quantity) of detectors 15, 25 are measured.

Then, the reflective liquid-crystal panels 13, 23 are rotated about the axis almost parallel to the direction of incidence of the incident light, and the angle between the orientation direction of liquid crystal molecules at the substrate on the incident light side and the polarization direction of the incident light becomes an arrangement angle $\alpha^{in}_2$. The output signals $I_{x2}$ of detectors 15, 25 in the parallel Nicol state are then measured, followed by measurements of the output signals $I_{y2}$ of detectors 15, 25 in the cross Nicol state.

The measured output signals $I_{x1}$, $I_{y1}$, $I_{x2}$, $I_{y2}$, the reflection factors $R_{x1}$, $R_{y1}$ at the arrangement angle $\alpha^{in}_1$, and the reflection factors $R_{x2}$, $R_{y2}$ at the arrangement angle $\alpha^{in}_2$ satisfy the relationships represented by (Equation 12).

$$I_{x1}=(I_0 R_{x1}+I_{cx})t_x$$

$$I_{y1}=(I_0 R_{y1}+I_{cy})t_y$$

$$I_{x2}=(I_0 R_{x2}+I_{cx})t_x$$

$$I_{y2}=(I_0 R_{y2}+I_{cy})t_y \quad \text{(Equation 12)}$$

The reflection factors $R_{x1}$, $R_{y1}$, $R_{x2}$, $R_{y2}$ at the arrangement angles $\alpha^{in}_1$, $\alpha^{in}_2$ are the functions of the gap of the reflective liquid-crystal panel and are represented by (Equation 10). $t_x$, $t_y$ are the transmissivities of the half-mirror 12 relating to the polarization in the direction almost parallel to the polarization direction of the incident light and to the polarization in the direction perpendicular thereto, respectively. As shown in FIG. 5, when no half-mirror is used, $t_x$ and $t_y$ are 1. $I_{cx}$, $I_{cy}$ are the noise light quantity in the direction almost parallel to the polarization direction of the incident light and the noise light quantity in the direction perpendicular thereto, respectively.

The gap d of the reflective liquid-crystal panel, quantity $I_0$ of incident light, and noise light quantities $I_{cx}$, $I_{cy}$ can be detected from (Equation 12) and (Equation 10).

Thus, the gap of the reflective liquid-crystal panel which takes into account the noise light quantity can be detected by measuring the output signals $I_{x1}$, $I_{y1}$, $I_{x2}$, $I_{y2}$ of the detector at two arrangement angles $\alpha^{in}_1$, $\alpha^{in}_2$ of the reflective liquid-crystal panel. Therefore, the gap d of the reflective liquid-crystal panel can be detected with a high accuracy.

In order to detect the gap d with even higher accuracy, the output signal of detector is preferably measured at no less than three arrangement angles. Then the gap d, the quantity $I_0$ of incident light, and noise light quantities $I_{cx}$, $I_{cy}$ are determined by fitting based on the measured output signals, for example, by using (Equation 13).

$$I_x(\alpha^{in}) = [I_0 \cdot R_x(\alpha^{in}) + I_{cx}]t_x$$

$$I_y(\alpha^{in}) = [I_0 \cdot R_y(\alpha^{in}) + I_{cy}]t_y \quad \text{(Equation 13)}$$

Here, $I_x(\alpha^{in})$, $I_y(\alpha^{in})$ are the output signals in the parallel Nicol arrangement and cross Nicol arrangement, respectively, at an arrangement angle $\alpha^{in}$ of the reflective liquid-crystal panel. $R_x(\alpha^{in})$, $R_y(\alpha^{in})$ are the reflection factors of the detector in the parallel Nicol arrangement and cross Nicol arrangement, respectively, at a arrangement angle $\alpha^{in}$ of the reflective liquid-crystal panel.

The transmissivities $t_x$, $t_y$ of the half-mirror are measured, for example, by using the method described in Test Example 3 hereinbelow. When the output signal of detector is measured at no less than three arrangement angles, any one of the transmissivities $t_x$, $t_y$ of the half-mirror is considered as a variable and the gap d, quantity $I_0$ of incident light, noise light quantities $I_{cx}$, $I_{cy}$, and any one of the transmissivities $t_x$, $t_y$ of the half-mirror may be determined by fitting. In this case, the other of the two transmissivities $t_x$, $t_y$ of the half-mirror (the one that is not variable) is set at random (for example, as 1).

The gap d, quantity $I_0$ of incident light, and noise light quantity $I_{cx}$, $I_{cy}$ can be also determined by using (Equation 14) similar to (Equation 13) in place of (Equation 13).

$$I_x(\alpha^{in}) = I_{0x} \cdot R_x(\alpha^{in}) + I'_{cx}$$

$$I_y(\alpha^{in}) = I_{0y} \cdot R_y(\alpha^{in}) + I'_{cy}$$

$$I'_{cx} = I_{cx} \cdot t_x$$

$$I'_{cy} = I_{cy} \cdot t_y$$

$$I_{0x} = I_0 \cdot t_x$$

$$I_{0y} = I_0 \cdot t_y \quad \text{(Equation 14)}$$

Furthermore, a common noise light quantity (dark light quantity) is sometimes added to both $I_x(\alpha^{in})$ and $I_y(\alpha^{in})$ in (Equation 13) or (Equation 14). In such case, for example, the output signal of detector is measured in a state in which the detector is closed with a shutter and the measured output signal is considered as a dark light quantity of detector. Then, the dark light quantity is subtracted from the output signal of detector.

In order to detect the gap of a reflective liquid-crystal panel with a high accuracy, the arrangement angles of the reflective liquid-crystal panel preferably differ from each other by no less than 5°.

When the output signals of detector are measured at different arrangement angles of the reflective liquid-crystal panel, the two-dimensional distribution of the gap of the reflective liquid-crystal panel is difficult to detect by using a surface-type imaging element such as CCD as the detector. When the two-dimensional distribution of the gap of the reflective liquid-crystal panel is detected by using a surface-type imaging element such as CCD as the detector, the output signal of the detector should be measured at a fixed arrangement angle of the reflective liquid-crystal panel. In this case, the quantity $I_0$ of incident light, noise light quantities $I_{cx}$, $I_{cy}$, and transmissivities $t_x$, $t_y$ of the half-mirror are determined in advance.

For example, a plurality of reflective liquid-crystal panels with different gaps are prepared and the output signals of detector in the parallel Nicol state and cross Nicol state are measured at different arrangement angles. The quantity $I_0$ of incident light, noise light quantities $I_{cx}$, $I_{cy}$, and transmissivities $t_x$, $t_y$ of the half-mirror are determined, for example, by (Equation 12) by using the measured output signals of the detector. Then, the arrangement angle of the reflective liquid-crystal panel, which is the object of detection, is fixed and the output signals of the detector in the parallel Nicol state and cross Nicol state are measured. Then, the gap of the reflective liquid-crystal panel is calculated, for example, by one or two equations in (Equation 12) by using the measured output signals of the detector and the quantity $I_0$ of incident light, noise light quantities $I_{cx}$, $I_{cy}$, and transmissivities $t_x$, $t_y$ of the half-mirror determined in advance. In this case, it is also possible to fix the arrangement angle of the reflective liquid-crystal panel, which is the object of detection, and to measure the output signal of the detector in either the parallel Nicol state or the cross Nicol state. The gap of the reflective liquid-crystal panel can be detected with higher accuracy when it is detected based on the output signals of the detector in the parallel Nicol state and cross Nicol state.

Alternatively, a plurality of reflective liquid-crystal panels with different gaps are prepared and the output signals of the detector are measured in the parallel Nicol state and cross Nicol state at different arrangement angles. The noise light quantities $I_{cx}$, $I_{cy}$, and transmissivities $t_x$, $t_y$ of the half-mirror are determined, for example, by (Equation 12) by using the measured output signals of the detector. Then, the arrangement angle of the reflective liquid-crystal panel, which is the object of measurements, is fixed and the output signals of the detector in the parallel Nicol state and cross Nicol state are measured. Then, the gap of the reflective liquid-crystal panel is calculated, for example, by the first two equations or last two equations of (Equation 12) by using the measured output signals of detector and predetermined noise light quantities $I_{cx}$, $I_{cy}$, and transmissivities $t_x$, $t_y$ of the half-mirror. In this case, a equation containing gap d and the quantity $I_0$ of incident light is obtained.

The noise light quantities $I_{cx}$, $I_{cy}$ can be determined not only from the output signals of the detector in the parallel Nicol state and cross Nicol state obtained at a plurality of arrangement angles of the reflective liquid-crystal panel which is the object of detection. For example, they can be also determined from the output signals of the detector in the parallel Nicol state and cross Nicol state at a plurality of arrangement angles of a reflective liquid-crystal panel which is composed of the same materials such as glass, electrodes, oriented films, liquid crystals, and the like as the reflective liquid-crystal panel which is the object of detection.

A method that can detect the gap of a reflective liquid-crystal panel by taking into account the noise light quantity even when the measurement of the output signal of the detector in the parallel Nicol state and cross Nicol state is conducted at one arrangement angle will be described below.

The noise light quantity has a component of surface reflected light produced at the glass substrate surface of reflective liquid-crystal panel and a component of external light or stray light. When light with a linear polarization is incident upon a reflective liquid-crystal panel, the surface reflected light with a linear polarization of the same polarization direction as the polarization direction of the incident light is reflected. Therefore, the noise light quantity in the parallel Nicol state contains the surface reflected light and the external-stray light. On the other hand, the noise light quantity in the cross Nicol state contains only the external-stray light.

Therefore, the noise light quantity can be detected by the following method.

First, a sample is prepared in which a glass substrate identical to that of the reflective liquid-crystal panel, which is the object of detection, is placed on a light-absorbing material such as a black glass or a black velvet sheet. Then, the output signal $I_x$ of the detector is measured under a condition that the reflection factor $R_x$ in the parallel Nicol state is almost 0 by using the sample. In this case, since the reflection factor $R_x$ is almost 0, the first equation in (Equation 13) becomes (Equation 15).

$$I_x = I_{cx} \cdot t_x \quad \text{(Equation 15)}$$

The noise light quantity $I_{cx}$ which contains the surface reflected light can be determined from (Equation 15).

Then a sample is prepared which has no birefringence with respect to the direction of incidence of the incident light (for example, a metal reflective plate such as aluminum plate, silver plate, and the like) or a sample in which a glass substrate identical to the reflective liquid-crystal panel, which is the object of detection, is arranged on a metal reflective plate. Then, the output signal $I_y$ of the detector is measured under a condition that the reflection factor $R_y$ in the cross Nicol state is almost 0 by using the sample. In this case, since the reflection factor $R_y$ is almost 0, the second equation in (Equation 13) becomes (Equation 16).

$$I_y = I_{cy} \cdot t_y \quad \text{(Equation 16)}$$

The noise light quantity $I_{cy}$ which contains the external light can be determined from (Equation 16).

Furthermore, the noise light quantity $I_{cy}$ in the cross Nicol state can be determined from the output signal of the detector in the cross Nicol state when no sample is disposed.

If the noise light quantities $I_{cx}$, $I_{cy}$ are found, there are two variables in (Equation 14): gap d of the reflective liquid-crystal panel and quantity $I_0$ of incident light. For this reason, gap d of the reflective liquid-crystal panel can be determined from the output signals $I_x$, $I_y$ of the detector in the parallel Nicol state and cross Nicol state at one arrangement angle.

Furthermore, the noise light quantity $I_{cx}$ in the parallel Nicol state can be also handled as a function of the quantity $I_0$ of incident light in the below-described manner.

The noise light quantity $I_{cx}$ in the parallel Nicol state can be represented by (Equation 17) wherein $I_s$ stands for the quantity of the surface reflected light.

$$I_{cx} = I_s + I_{cy} \quad \text{(Equation 17)}$$

The reflection factor $R_s$ on the glass substrate surface of a liquid-crystal panel can be represented by (Equation 18) by using the refractive index $n_a (=1)$ of air and the refractive index $n_g$ of glass.

$$R_s = I_s/(I_0 + I_s) = (n_a - n_g)^2 / (n_a + n_g)^2 \quad \text{(Equation 18)}$$

The noise light quantity $I_{cx}$ in the parallel Nicol state can be represented from (Equation 17) and (Equation 18) by (Equation 19).

$$I_{cx} = R_s \cdot I_0 / (1 - R_s) + I_{cy} \quad \text{(Equation 19)}$$

The noise light quantity $I_{cy}$ is determined separately, for example, by (Equation 16).

As a result, there are two variables in (Equation 13): gap d of the reflective liquid-crystal panel and quantity $I_0$ of incident light. For this reason, gap d of the reflective liquid-crystal panel can be determined from the output signals $I_x$, $I_y$ of detector in the parallel Nicol state and cross Nicol state at one arrangement angle.

As described above, the output signal $I_x$ of detector was measured by arranging the analyzer in the parallel Nicol state and the output signal $I_y$ of the detector was measured by arranging the analyzer in the cross Nicol state, but the $I_x$ and $I_y$ can be also measured at the same time.

Figure 8:
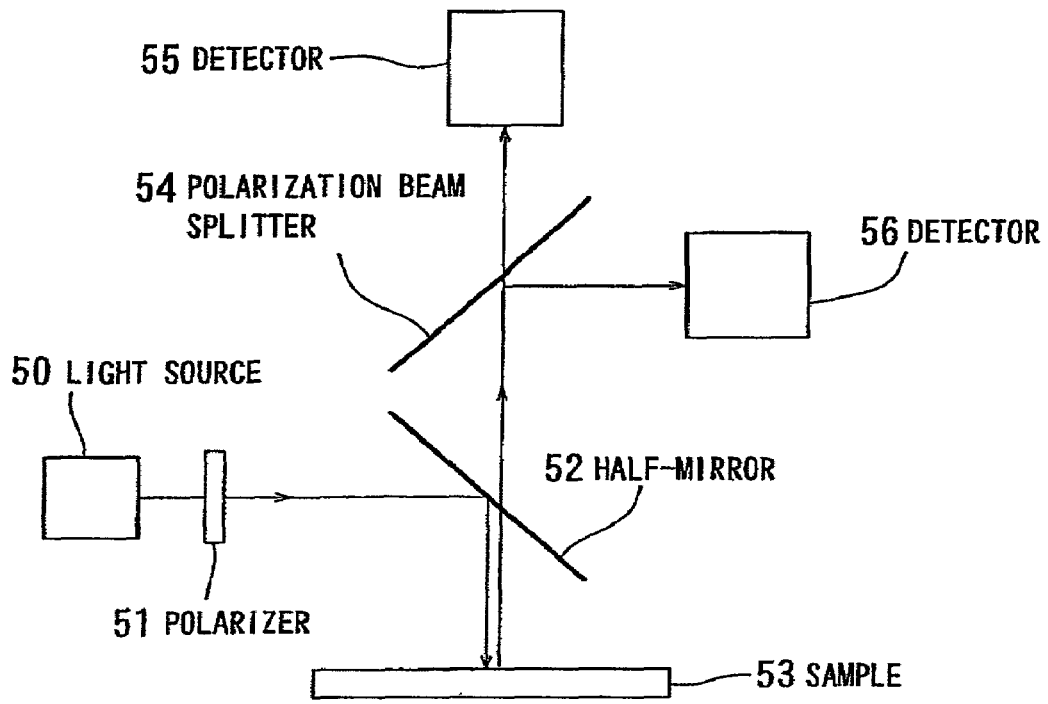
FIG. 8 illustrates another example of the measurement device used in the method for detecting the gap of a liquid-crystal panel in accordance with the present invention.

FIG. 8 shows a measurement apparatus that can be used to measure the $I_x$ and $I_y$ at the same time. In the measurement apparatus shown in FIG. 8, a polarization beam splitter is used instead of the analyzer and a plurality of detectors are used.

In the measurement apparatus shown in FIG. 8, light from a light source 50 is linearly polarized with a polarizer and then reflected with a half-mirror 52. The light reflected by the half-mirror 52 propagates almost parallel to the normal to a reflective liquid-crystal panel (sample) 53 and falls on the reflective liquid-crystal panel 53.

The light reflected by the reflective liquid-crystal panel 53 propagates to a polarization beam splitter 54 via the half-mirror 52. The polarization beam splitter 54 separates a light having the polarization direction almost parallel to the polarization direction of polarizer 51 (polarization direction of the incident light of reflective liquid-crystal panel 53) and light having the polarization direction almost perpendicular to the polarization direction of the polarizer from the incident light.

The quantity of light having the polarization direction almost parallel to the polarization direction of the incident light of reflective liquid-crystal panel 53, this light coming from the polarization beam sprinter 54, is detected with a first detector 55, and the quantity of light having the polarization direction almost perpendicular to the polarization direction of the incident light of reflective liquid-crystal panel 53 is detected with a second detector 56. Depending of the configuration of polarization beam sprinter 54, the quantity of light having the polarization direction almost parallel to the polarization direction of the incident light of reflective liquid-crystal panel 53 can be detected with the first detector 55 and the quantity of light having the polarization direction almost perpendicular to the polarization direction of the incident light of reflective liquid-crystal panel 53 can be detected with the second detector 56.

With the measurement apparatus shown in FIG. 8, the detection of the quantity $I_x$ of light having the polarization direction almost parallel to the polarization direction of the incident light (detection in the parallel Nicol state) and the detection of the quantity $I_y$ of light having the polarization direction almost perpendicular to the polarization direction of the incident light (detection in the cross Nicol state) can be conducted without changing the arrangement state of the analyzer. Therefore, $I_x$, $I_y$ can be detected in a simple manner and within a short time.

The gap of the reflective liquid-crystal panel can be detected by the above-described method based on the detected $I_x$, $I_y$.

Furthermore, a plurality of light sources with different wavelengths can be also used as the light source. In the measurement apparatus shown in FIG. 9, two light sources 60, 61 with different wavelengths are used as the light source. In the measurement apparatus shown in FIG. 9, light from the light source 60 is linearly polarized with a polarizer 62 and then falls on a half-mirror. Furthermore, light from the light source 60 is linearly polarized with a polarizer 63 and then falls on a half-mirror 65. Another configuration thereof is the same as that of the measurement apparatus shown in FIG. 8. The polarization directions of polarizer 62 and polarizer 63 are the same.

Figure 9:
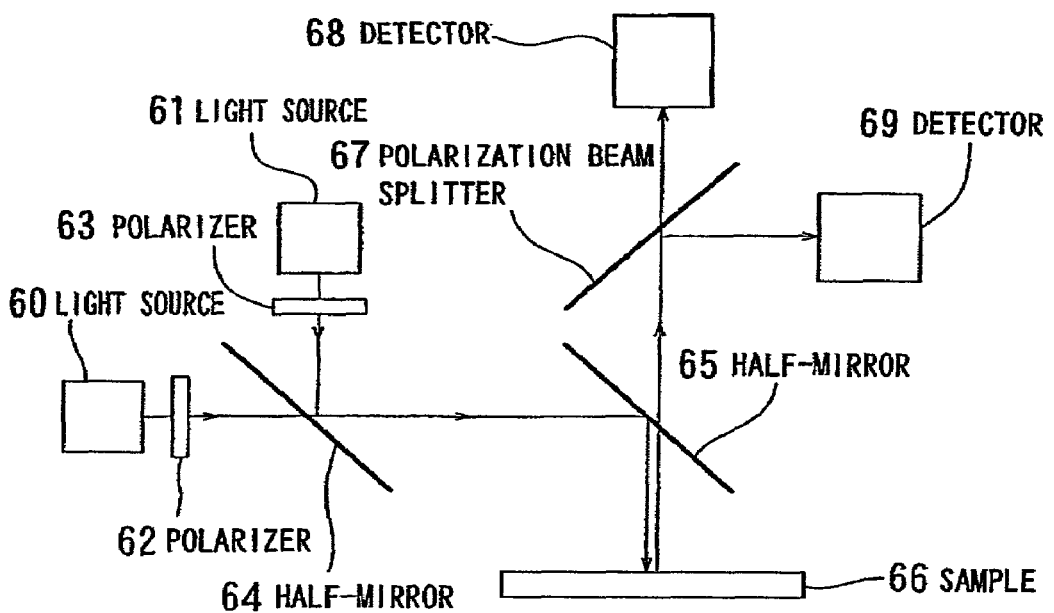
FIG. 9 illustrates another example of the measurement device used in the method for detecting the gap of a liquid-crystal panel in accordance with the present invention.

In the measurement apparatus shown in FIG. 9, the reflective liquid-crystal panel 66 can be illuminated with light of different wavelengths by selectively activating the light source 60 and light source 61. As a result, the quantity of reflected light of the reflective liquid-crystal panel can be detected by using light of different wavelength in a simple manner and within a short time.

TEST EXAMPLES

Examples of detecting the gap of samples by using the method for detecting the gap of a liquid-crystal panel in accordance with the present invention and the apparatus therefore will be described below.

The following sample was fabricated as the first sample of reflective liquid-crystal panel.

Polyimide films were spin coated on two glass substrates to obtain a coating thickness of about 70 nm. The surface was then unidirectionally rubbed with a Nylon cloth, and an adhesive having resin beads with a diameter of 4 μm admixed thereto was coated on the polyamide film on one of the substrates. The two substrates were then placed opposite each other, so that the polyimide films were on the inner side, and bonded to each other so that the directions along which the polyimide films were rubbed were perpendicular to each other. A liquid crystal was then injected by a capillary effect and a transmission TN liquid-crystal panel (twisting angle $\phi=90°$) was fabricated.

Similarly, a transmission STN liquid-crystal panel was fabricated by conducting rubbing so as to obtain a twisting angle of $\phi=240°$, bonding by using resin beads with a diameter of 7 μm, and injecting a liquid crystal by a capillary effect.

Gap d of those transmission liquid-crystal panels was measured by an SPM method (disclosed in Japanese Patent Application Laid-open No. 10-153780). In the Transmission TN liquid-crystal panel the d was 3.87 μm, and in the transmission STN liquid-crystal pane the d was 6.44 μm.

Reflective TN liquid-crystal panel and reflective STN were fabricated by attaching reflective mirrors fabricated by sputtering Al on glass substrates to one side of the transmission TN liquid-crystal panel and transmission STN panel.

The gap of samples of those reflective liquid-crystal panels was measured by the following method.

Test Example 1

Figure 7:
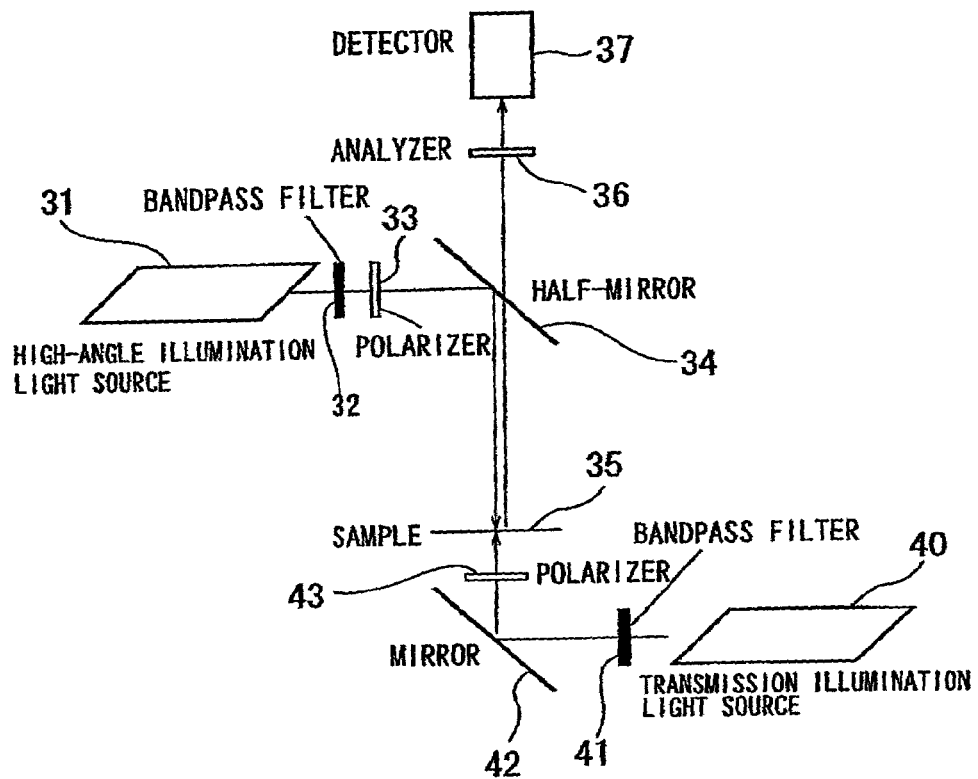
FIG. 7 illustrates another example of the measurement device used in the method for detecting the gap of a liquid-crystal panel in accordance with the present invention.

A monochromatizing bandpass filter (central wavelength 550 nm) 32 was installed on a high-angle illumination light source 31 of a reflective transmission microscope (obtained by installing a universal high-angle illumination light source on OPTIPHOT 2-POL produced by Nikon Corp.) having an optical system shown in FIG. 7, and a polarizer 33 and analyzer 36 on the high-angle illumination light source side were aligned so as to obtain a cross Nicol state. At this time, a transmission illumination light source 40 was turned off. The polarization direction of incident light was set parallel to the paper sheet in FIG. 7.

Then, a sample (reflective liquid-crystal panel) 35 was placed, with the reflective mirror facing down, on a sample table (manually rotatable). At this time, the sample was arranged so that the polarization direction of liquid crystal on the incident light side (upper substrate side) coincided with the polarization direction of incident light.

Then, the table with the sample were rotated and an angle at which the view field became the darkest, that is, an extinction angle at which the reflection factor reached minimum was measured, while the view field of the reflective polarization microscope was checked visually. Gap d of the sample was then calculated from the measured extinction angle and (Equation 8). In the TN liquid-crystal panel, d was 3.86 μm, in the STN liquid-crystal panel, the d was 6.58 μm.

Test Example 2

Similarly, a sample rotation angle (extinction angle) at which the output signal (received light quantity) of detector (using photoelectric multiplier) 37 reached minimum was measured. Gap d of the sample was then calculated from the measured extinction angle and (Equation 8). In the TN liquid-crystal panel, d was 3.86 μm, in the STN liquid-crystal panel, the d was 6.62 μm.

Test Example 3

The high-angle illumination light source 31 was turned off and the transmission illumination light source 40 was turned on. Then, a monochromatizing bandpass filter (central wavelength 550 nm) 41 was installed on the transmission illumination light source 40 and the polarizer 43 and analyzer 36 on transmission illumination light source side were aligned so as to obtain the parallel Nicol state. At this time, the polarization direction of incident light was set parallel to the paper sheet in FIG. 7.

The output signal $I_{x0}$ of detector 37 was then measured in a state in which only a sample of reflective liquid-crystal panel was placed on the sample table. A condition $I_{x0}=t_x \cdot I_t$ was satisfied, where $t_x$ stands for a transmissivity of half-mirror 34 with respect to incident light and $I_t$ stands for a quantity of light of transmission illumination light source.

Then, the polarizer 43 and analyzer 36 on the transmission illumination light source side were rotated through 90° a each and the output signal $I_{y0}$ of detector 37 was measured. A condition $I_{y0}=t_y \cdot I_t$ was satisfied, where $t_y$ stands for a transmissivity of the half-mirror with respect to incident polarization rotated through 90°.

The transmission illumination light source 40 was then turned off and the high-angle illumination light source 31 was turned on. Then, a monochromatizing bandpass filter (central wavelength 550 nm) 32 was installed on the high-angle illumination light source 40 and the polarizer 33 and analyzer 36 on the high-angle illumination light source side were aligned so as to obtain the parallel Nicol state. At this time, polarization direction of incident light was set parallel to the paper sheet in FIG. 7.

The sample 35 of reflective liquid-crystal panel was then arranged so that the polarization direction of liquid crystal on the incident light side (upper substrate side) coincided with the polarization direction of incident light. In this state, the output signal $I_x$ of detector 37 was measured. A condition $I_x=R_x \cdot t_x \cdot I_r$ was satisfied, where $I_r$ stands for a quantity of light of high-angle illumination light source 31.

The analyzer 36 was then rotated through 90° and the output signal $I_y$ of detector 37 was measured. A condition $I_y=R_y \cdot t_y \cdot I_r$ was satisfied, where $I_r$ stands for a quantity of light of high-angle illumination light source 31.

The reflection factors $R_x$, $R_y$ were then calculated from the measured $I_x$, $I_{x0}$, $I_y$, $I_{y0}$ and (Equation 20) and the gap d of sample 35 was calculated by fitting the calculated reflection factors $R_x$, $R_y$ in (Equation 10). As a result, in the TN liquid-crystal panel, d was 3.87 µm, and in the STN liquid-crystal panel, d was 6.60 µm.

$$\frac{\frac{I_x}{I_{x0}}}{\frac{I_x}{I_{x0}}+\frac{I_y}{I_{y0}}} = \frac{\frac{R_x t_x I_r}{t_x I_t}}{\frac{R_x t_x I_r}{t_x I_t}+\frac{R_y t_y I_r}{t_y I_t}} = R_x \quad \text{(Equation 20)}$$

$$\frac{\frac{I_y}{I_{y0}}}{\frac{I_x}{I_{x0}}+\frac{I_y}{I_{y0}}} = \frac{\frac{R_y t_y I_r}{t_y I_t}}{\frac{R_x t_x I_r}{t_x I_t}+\frac{R_y t_y I_r}{t_y I_t}} = R_y$$

The following sample was fabricated as the second sample of reflective liquid-crystal panel.

First, an oriented film varnish AL3000 for liquid-crystal displays manufactured by JSR Corp. was spin coated on one surface of each of two glass substrates. Coating was followed by baking and polyimide films with a thickness of about 70 nm were formed. Then, the surface of polyimide films was rubbed with a rayon velvet cloth, and the polyimide film on one of the glass substrates was coated with an adhesive having resin beads with a diameter of 3.0 µm admixed thereto. The two substrates were then placed opposite each other so that the polyimide films were on the inner side and bonded to each other so that the rubbing directions were at an angle of 70°. A liquid crystal with a birefringence Δn of 0.070 at a wavelength of 550 nm was then injected by a capillary effect and a transmission TN liquid-crystal panel (twisting angle φ=70°) was fabricated.

The gap d of the transmission TN liquid-crystal panels was measured by a rotating analyzer method by using the gap measurement apparatus RETS manufactured by Otsuka Electronics Co., Ltd. The gap d was 2.94 µm.

A reflective TN liquid-crystal panel was then fabricated by attaching a reflective sheet fabricated by sputtering Al to one side of the transmission TN liquid-crystal panel.

The gap d of the reflective liquid-crystal panel was measured by the following method.

Test Example 4

A reflective polarization microscope (obtained by installing a universal high-angle illumination light source on OPTIPHOT 2-POL produced by Nikon Corp.) having an optical system shown in FIG. 7 was used for gap detection. A measurement wavelength of 550 nm was obtained by installing a monochromatizing bandpass filter (central wavelength 550 nm) 32 on a high-angle illumination light source 31. A polarizer 33 on the side of high-angle illumination light source 31 was adjusted to set the polarization direction onto the sample so that it was perpendicular to the paper surface. The reflective liquid-crystal panel 35 serving as a sample was arranged so that the orientation direction of liquid crystal on the incident light side (upper substrate side) coincided with the polarization direction of incident light.

The high-angle illumination light source 31 was turned on (transmission illumination light source 40 turned off), the analyzer 36 and polarizer 33 on the high-angle illumination light source side were set so as to obtain the parallel Nicol state and the output signal $I_{x1}$ of detector 37 was measured. The analyzer 36 was then rotated through 90° to obtain the cross Nicol state and the output signal $I_{y1}$ of detector 37 in the cross Nicol state was measured.

The reflective liquid-crystal panel 35, which was a sample, was then rotated clockwise through 5°, as viewed from the direction of incidence of incident light, to obtain an angle between the polarization direction of incident light and the orientation direction of liquid crystal on the incident light side of 5°. Then, the output signals $I_{x2}$, $I_{y2}$ of detector 37 in the parallel Nicol state and cross Nicol state were measured by the same procedure as described above.

The reflective liquid-crystal panel 35, which was a sample, was then further rotated clockwise through 5°, and the output signals $I_{x3}$, $I_{y3}$ of detector 37 in the parallel Nicol state and cross Nicol state were measured by the same procedure as described above.

The reflective liquid-crystal panel 35, which was a sample, was then further rotated clockwise through 5°, and the output signals $I_{x4}$, $I_{y4}$ of detector 37 in the parallel Nicol state and cross Nicol state were measured by the same procedure as described above.

Then, the gap d, quantity $I_0$ of incident light, noise light quantities $I_{cx}$, $I_{cy}$, and transmissivity $t_x$ of half mirror 34 were determined by fitting the measured output signals $I_{x1}$, $I_{y1}$~$I_{x4}$, $I_{y4}$ by using (Equation 13). The transmissivity $t_y$ of the half-mirror is fixed to 1.

The gap d obtained was 2.95 µm.

Test Example 5

In Test Example 4, the reflective liquid-crystal panel 35, which was a sample, was rotated by 5° and the output signals of detector 37 in the parallel Nicol state and cross Nicol state at a total of four arrangement angles were measured.

In Test Example 5, the output signals of detector 37 in the parallel Nicol state and cross Nicol state were measured at one arrangement angle. Thus, the reflective liquid-crystal panel 35, which was a sample, was arranged so that the orientation direction of liquid crystal on the incident light side coincided with the polarization direction of incident light, and the output signals $I_{x1}$, $I_{y1}$ of detector 37 in the parallel Nicol state and cross Nicol state at this time were measured.

Then, the reflective liquid-crystal panel 35 was removed, a black glass was used in place of it as a sample, and the output signal $I_x$ of detector 73 in the parallel Nicol state was measured. Then, the noise light quantity $I_{cx}$ was found by using the measured output signal $I_x$ and transmissivity $t_x$ of half-mirror 34 determined in Test Example 4 (Equation 15).

Then an aluminum reflection plate attached to reflective liquid-crystal panel 35 was used as a sample and the output signal $I_y$ of detector 37 in the cross Nicol state was measured. In Test Example 4, the transmissivity $t_y$ of half-mirror 34 was fixed to 1. For this reason, the measured output signal $I_y$ was considered as the noise light quantity $I_{cy}$ based on (Equation 17).

The gap d and quantity $I_0$ of incident light were then found by fitting the transmissivity $t_x$ of half-mirror 34 found in Test Example 4, transmissivity $t_y$ of half-mirror 34 fixed to 1, noise light quantities $I_{cx}$, $I_{cy}$ found by the above-described procedure, and measured output signals $I_{x1}$, $I_{y1}$ by using (Equation 13).

The gap d obtained was 2.96 μm.

The method and apparatus for detecting the gap of a liquid-crystal panel in accordance with the present invention are not limited to the configurations described in the embodiments, and various changes, additions, and deletions are possible without affecting the essence of the present invention.

What is claimed is:

1. A method for detecting the gap of a liquid-crystal panel, the method comprising the steps of:

arranging the liquid-crystal panel so that a polarized incident light is incident almost parallel to the normal to the liquid-crystal panel and the reflected light from the liquid-crystal panel is received by a received light quantity detection device via an analyzer having a transmission axis almost perpendicular to the polarization direction of the incident light;

rotating the direction of polarization of the incident light with respect to the liquid-crystal panel and detecting the extinction angle at which the intensity of light detected by the received light quantity detection device reaches minimum; and detecting the gap of the liquid-crystal panel based on the detected extinction angle, wherein gap d of the liquid-crystal panel is detected by the following equations by using the detected extinction angle $\phi_{app}$:

$$\tan 2\phi\, app = \tan 2\left(\phi\, app + \frac{\Pi}{2}\right) = \phi \frac{\tan X}{X}$$

$$X = \sqrt{\phi^2 + \beta^2} \qquad \beta = \frac{\Pi \Delta n\, d}{\lambda}$$

$$\Delta n = \frac{n_e \cdot n_o}{\sqrt{n_o^2 + (n_e^2 - n_o^2)\sin^2\theta}} - n_o$$

where λ is the wavelength of the incident light, φ is the twisting angle of the liquid-crystal panel, $n_o$ is the refractive index of the liquid crystal material with respect to ordinary light, $n_e$ is the refractive index of the liquid crystal material with respect to extraordinary light, Δn is the refractive index anisotropy of the liquid-crystal panel, and θ is the tilt angle of the liquid-crystal panel.

2. A method for detecting the gap of a liquid-crystal panel, the method comprising the steps of:

arranging the liquid-crystal panel so that a polarized incident light falls almost parallel to the normal to the liquid-crystal panel and the reflected light from the liquid-crystal panel is received by a received light quantity detection device via an analyzer;

detecting a first output signal from the received light quantity detection device in a state in which the transmission axis of the analyzer is arranged so as to be almost parallel to the polarization direction of the incident light;

detecting a second output signal from the received light quantity detection device in a state in which the transmission axis of the analyzer is arranged so as to be almost perpendicular to the polarization direction of the incident light; and detecting the gap of the liquid-crystal panel based on the first and second output signals, wherein gap d of the liquid-crystal panel is detected by the following equations by using the first output signal $R_x$ and the second output signal $R_y$:

$$R_x = \cos^2_{\mathit{eff}} + \cos^2(_{app} + {}^{in})\sin^2_{\mathit{eff}}$$

$$R_y = \sin^2(_{app} + {}^{in})\sin^2_{\mathit{eff}}$$

$$\cos\beta_{\mathit{eff}} = soc^2 X + (\phi^2 - \beta^2)\frac{\sin^2 X}{X^2}$$

$$\cos 2\phi_{app} \cdot \sin\beta_{\mathit{eff}} = 2\beta \frac{\sin X \cdot \cos X}{X}$$

$$\sin 2\phi_{app} \cdot \sin\beta_{\mathit{eff}} = 2\phi\beta \frac{\sin^2 X}{X^2}$$

$$\beta_{\mathit{eff}} = \frac{2\Pi \cdot \Delta n_{\mathit{ef}} f \cdot d}{\lambda}$$

$$\tan 2\phi_{app} = \phi \frac{\tan X}{X}$$

$$X = \sqrt{\phi^2 + \beta^2} \qquad \beta = \frac{\pi \Delta n\, d}{\lambda}$$

$$\Delta n = \frac{n_e \cdot n_o}{\sqrt{n_o^2 + (n_e^2 - n_o^2)\sin^2\theta}} - n_o$$

where λ is the wavelength of the incident light, φ is the twisting angle of the liquid-crystal panel, $n_o$ is the refractive index of the liquid crystal material with respect to ordinary light, $n_e$ is the refractive index of the liquid crystal material with respect to extraordinary light, Δn is the refractive index anisotropy of the liquid-crystal panel, θ is the tilt angle of the liquid-crystal panel, and $\alpha^{in}$ is the angle between the polarization direction of the incident light and the orientation direction of liquid crystal molecules at the substrate on the incident light side.

3. A method for detecting the gap of a liquid-crystal panel, the method comprising the steps of:

arranging the liquid-crystal panel so that a polarized incident light falls almost parallel to the normal to the liquid-crystal panel and the reflected light from the liquid-crystal panel is received by a received light quantity detection device via an analyzer;

detecting a first output signal from the received light quantity detection device in a state in which the transmission axis of the analyzer is arranged so as to be almost parallel to the polarization direction of the incident light;

detecting a second output signal from the received light quantity detection device in a state in which the transmission axis of the analyzer is arranged so as to be almost perpendicular to the polarization direction of the incident light; and detecting the gap of the liquid-crystal panel based on the first and second output signals; and detecting a third output signal from the received light quantity detection device in a state in which the transmission axis of the analyzer is located on a bisector of the direction almost parallel to the polarization direction of the incident light and the direction almost perpendicular thereto, and in the step of detecting the gap of the liquid-crystal panel, the gap of the liquid-crystal panel is detected based on the first, second, and third output signals.

4. The method for detecting the gap of a liquid-crystal panel as described in claim 3, wherein gap d of the liquid-crystal panel is detected by the following equations by using the first output signal $R_x$, the second output signal $R_y$, and the third output signal $R_{xy}$:

$$R_{xy} = \frac{1}{2}[1 + \sin^2\beta_{eff} \cdot \sin 4(\phi_{app} + \alpha^{in})]$$

$$R_x = \cos^2\beta_{eff} + \cos^2(_{app} + {}^{in})\sin^2\beta_{eff}$$

$$R_y = \sin^2(_{app} + {}^{in})\sin^2\beta_{eff}$$

$$\cos\beta_{eff} = soc^2 X + (\phi^2 - \beta^2)\frac{\sin^2 X}{X^2}$$

$$\cos 2\phi_{app} \cdot \sin\beta_{eff} = 2\beta\frac{\sin X \cdot \cos X}{X}$$

$$\sin 2\phi_{app} \cdot \sin\beta_{eff} = 2\phi\beta\frac{\sin^2 X}{X^2}$$

$$\beta_{eff} = \frac{2\Pi \cdot \Delta n_{ef} f \cdot d}{\lambda}$$

$$\tan 2\phi_{app} = \phi\frac{\tan X}{X}$$

$$X = \sqrt{\phi^2 + \beta^2} \qquad \beta = \frac{\Pi \Delta n\, d}{\lambda}$$

$$\Delta n = \frac{n_e \cdot n_o}{\sqrt{n_o^2 + (n_e^2 - n_o^2)\sin^2\theta}} - n_o$$

where λ is the wavelength of the incident light, φ is the twisting angle of the liquid-crystal panel; $n_o$ is the refractive index of the liquid crystal material with respect to ordinary light, $n_e$ is the refractive index of the liquid crystal material with respect to extraordinary light Δn is the refractive index anisotropy of the liquid-crystal panel, θ is the tilt angle of the liquid-crystal panel, and $\alpha^{in}$ is the angle between the polarization direction of the incident light and the orientation direction of liquid crystal molecules at the substrate on the incident light side.

5. A method for detecting the gap of a liquid-crystal panel, the method comprising the steps of:

arranging the liquid-crystal panel so that a polarized incident light falls almost parallel to the normal to the liquid-crystal panel and the reflected light from the liquid-crystal panel is received by a received light quantity detection device via an analyzer;

detecting a first output signal from the received light quantity detection device in a state in which the transmission axis of the analyzer is arranged so as to be almost parallel to the polarization direction of the incident light;

detecting a second output signal from the received light quantity detection device in a state in which the transmission axis of the analyzer is arranged so as to be almost perpendicular to the polarization direction of the incident light; and detecting the gap of the liquid-crystal panel based on the first and second output signals;

measuring a fourth output signal representing the noise light quantity, which contains the surface reflected light from the received light quantity detection device as the main component, in a state in which the transmission axis of the analyzer is ranged so as to be almost parallel to the polarization direction of the incident light; and measuring a fifth output signal representing the noise light quantity, which contains the external light from the received light quantity detection device as the main component, in a state in which the transmission axis of the analyzer is disposed so as to be almost perpendicular to the polarization direction of the incident light, wherein the gap of the liquid-crystal panel is detected based on the first to fifth output signals.

6. An apparatus for detecting the gap of a liquid-crystal panel, comprising:

a light emission apparatus for causing a polarized incident light to fall almost parallel to the normal to the liquid-crystal panel;

an analyzer disposed so as to receive the reflected light from the liquid-crystal panel;

a received light quantity detection device for receiving the light that passed the analyzer; and a processing apparatus, wherein the processing apparatus detects the gap of the liquid-crystal panel based on a first output signal from the received light quantity detection device in a state in which the analyzer is disposed so that the transmission axis of the analyzer is almost parallel to the polarization direction of the incident light and a second output signal from the received light quantity detection device in a state in which the analyzer is disposed so that the transmission axis of the analyzer is almost perpendicular to the polarization direction of the incident light wherein the processing apparatus detects the gap of the liquid-crystal panel based on the first output signal, the second output signal, a fourth output signal representing the noise light quantity, which contains the surface reflected light from the received light quantity detection device as the main component, in a state in which the transmission axis of the analyzer is disposed so as to be almost parallel to the polarization direction of the incident light, and a fifth output signal representing the noise light quantity, which contains the external light from the received light quantity detection device as the main component, in a state in which the transmission axis of the analyzer is disposed so as to be almost perpendicular to the polarization direction of the incident light.

7. An apparatus for detecting the gap of a liquid-crystal panel, comprising:

a light emission apparatus for causing a polarized incident light to fall almost parallel to the normal to the liquid-crystal panel;

an analyzer disposed so as to receive the reflected light from the liquid-crystal panel;

a received light quantity detection device for receiving the light that passed the analyzer; and a processing apparatus, wherein the processing apparatus detects the gap, of the liquid-crystal panel based on a first output signal from the received light quantity detection device in a state in which the analyzer is disposed so that the transmission axis of the analyzer is almost parallel to the polarization direction of the incident light, a second output signal from the received light quantity detection device in a state in which the analyzer is disposed so that the transmission axis of the analyzer is almost perpendicular to the polarization direction of the incident light, and a third output signal from the received light quantity detection device in a state in which the analyzer is disposed so that the transmission axis of the analyzer is located on a bisector of the direction almost parallel to the polarization direction of the incident light and the direction almost perpendicular thereto.

8. The apparatus for detecting the gap of a liquid-crystal panel, as described in claim 7, wherein the light emission apparatus comprises a polarizer.

9. The apparatus for detecting the gap of a liquid-crystal panel, as described in claim 7, wherein the received light quantity detection device uses a surface-type imaging element.

10. The apparatus for detecting the gap of a liquid-crystal panel as described in claim 7, wherein the light emission apparatus or the received light quantity detection device has a wavelength selection function.

11. A method for detecting a gap of a liquid-crystal panel, the method comprising the steps of:
arranging the liquid-crystal panel so that a polarized incident light falls almost parallel to a normal to the liquid-crystal panel and a reflected light from the liquid-crystal panel is received by a received light quantity detection device via an analyzer;
detecting a first output signal $I_x$ from the received light quantity detection device in a first state in which the transmission axis of the analyzer is arranged so as to be almost parallel to a polarization direction of the incident light; and
detecting a second output signal $I_y$ from the received light quantity detection device in a second state in which a transmission axis of the analyzer is arranged so as to be almost perpendicular to the polarization direction of the incident light,
wherein the gap of the liquid crystal panel is detected based on reflection factors $R_x$ and $R_y$ of the liquid-crystal panel respectively in the first state in which the transmission axis of the analyzer is arranged so as to be almost parallel to the polarization direction of the incident light, and in the second state in which the transmission axis of the analyzer is arranged so as to be almost perpendicular thereto, the reflection factors $R_x$ and $R_y$ being calculated by using the following equations:

$$I_x = I_0 \cdot R_x + I_{cx}$$

$$I_y = I_0 \cdot R_y + I_{cy}$$

where $I_0$ is a quantity of incident light onto the liquid-crystal panel, $I_{ck}$ and $I_{cx}$ are noise light quantities respectively in the first state in which the transmission axis of the analyzer is arranged so as to be almost parallel to the polarization direction of the incident light, and in the second state in which the transmission axis of the analyzer is arranged so as to be almost perpendicular thereto, and the reflection factors $R_x$ and $R_y$ are functions of the gap and satisfy the relationship $[R_x + R_y = 1]$.

12. The method for detecting the gap of a liquid-crystal panel of claim 11, wherein in the step of detecting the first output signal $I_x$ and in the step of detecting the second output signal $I_y$, the detection is conducted in at least two different rotation positions obtained by rotating about an axis almost parallel to a direction of incidence of the incident light on the liquid-crystal panel as a center and the gap of the liquid-crystal panel is detected based on the first and the second output signals detected in each of the rotation positions.

13. The method for detecting the gap of a liquid-crystal panel of claim 12, wherein angles differ by no less than 5°.

14. The method for detecting the gap of a liquid-crystal panel of claim 11, wherein a half mirror is provided for reflecting a source light from a light source and directing the source light toward the liquid-crystal panel, and for transmitting the reflected light from the liquid-crystal panel, and wherein in the step of detecting the gap of the liquid-crystal panel, the gap of the liquid-crystal panel is detected by the first and the second output signals corrected based on a transmissivity of the half-mirror.

15. A method for detecting a gap of a liquid-crystal panel, this method comprising the steps of:
directing a polarized incident light almost parallel to the normal to the liquid-crystal panel;
directing reflected light from the liquid-crystal panel into a polarization beam splitter and separating a first reflected light with a first polarization direction almost parallel to the incident light polarization direction and a second reflected light with a second polarization direction almost perpendicular to the incident light polarization direction; and
detecting a quantity $I_x$ of first reflected light with the first polarization direction almost parallel to the incident light polarization direction with a first received light quantity detection device and detecting the quantity $I_y$ of second reflected light with a second polarization direction almost perpendicular to the incident light polarization direction with a second received light quantity detection device,
wherein the gap of the liquid crystal panel is detected based on reflection factors $R_x$ and $R_y$ of the liquid-crystal panel respectively in a first state in which a transmission axis of an analyzer is arranged so as to be almost parallel to the incident light polarization direction, and in a second state in which the transmission axis of the analyzer is arranged so as to be almost perpendicular thereto, the reflection factors $R_x$ and $R_y$ being calculated by using the following equations:

$$I_x = I_0 \cdot R_x + I_{cx}$$

$$I_y = I_0 \cdot R_y + I_{cy}$$

where $I_0$ is a quantity of incident light onto the liquid-crystal panel, $I_{cx}$ and $I_{cy}$ are noise light quantities respectively in the first state in which the transmission axis of the analyzer is arranged so as to be almost parallel to the polarization direction of the incident light, and in the second state in which the transmission axis of the analyzer is arranged so as to be almost perpendicular thereto, and the reflection factors $R_x$ and $R_y$ are functions of the gap and satisfy the relationship $[R_x + R_y = 1]$.

16. An apparatus for detecting a gap of a liquid-crystal panel, comprising:
a light emission apparatus for causing a polarized incident light to fall almost parallel to a normal to the liquid-crystal panel;
an analyzer disposed so as to receive a reflected light from the liquid-crystal panel;
a received light quantity detection device for receiving the light that passed the analyzer; and
a processing apparatus,
wherein the processing apparatus calculates reflection factors $R_x$ and $R_y$ of the liquid-crystal panel respectively in a first state in which a transmission axis of the analyzer is arranged so as to be almost parallel to the polarization direction of the incident light, and in a second state in which the transmission axis of the analyzer is arranged so as to be almost perpendicular thereto, by using a first output signal $I_x$ from the received light quantity detection device in the first state in which the transmission axis of the analyzer is arranged so as to be almost parallel to the polarization direction of the incident light and a second output signal $I_y$ from the received light quantity detection device in the second state in which the transmission axis of the analyzer is arranged so as to be almost perpendicular thereto, the reflection factors $R_x$ and $R_y$ being calculated by using the following equations:

$$I_x = I_0 \cdot R_x + I_{cx}$$

$$I_y = I_0 \cdot R_y + I_{cy}$$

where $I_0$ is a quantity of incident light onto the liquid-crystal panel, $I_{cx}$ and $I_{cy}$ are noise light quantities respectively in the first state in which the transmission axis of the analyzer is arranged so as to be almost parallel to the polarization direction of the incident light, and in the second state in which the transmission axis of the analyzer is arranged so as to be almost perpendicular thereto, and the reflection factors $R_x$ and $R_y$ are functions of the gap and satisfy the relationship $[R_x + R_y = 1]$, and wherein the processing apparatus detects the gap of the liquid crystal panel based on the calculated reflection factors $R_x$ and $R_y$.

17. The apparatus for detecting the gap of a liquid-crystal panel of claim 16, wherein the liquid-crystal panel rotates about an axis almost parallel to the direction of incidence of the incident light as a center.

18. The apparatus for detecting the gap of a liquid-crystal panel of claim 16, wherein the received light quantity detection device comprises a surface-type imaging element.

19. An apparatus for detecting a gap of a liquid-crystal panel, comprising:
a light emission apparatus for causing a polarized incident light to fall almost parallel to a normal to the liquid-crystal panel;
a polarization beam splitter disposed so as to receive reflected light from the liquid-crystal panel and separating a first reflected light having a first polarization direction almost parallel to an incident light polarization direction of the incident light and second reflected light having a second polarization direction almost perpendicular to the incident light polarization direction from the reflected light;
a first received light quantity detection device disposed so as to receive the first reflected light having the first polarization direction almost parallel to the incident light polarization direction, the first reflected light being received from the polarization beam splitter;
a second received light quantity detection device disposed so as to receive the second reflected light having the second polarization direction almost perpendicular to to incident polarization direction, to second reflected light being received from the polarization beam splitter; and
a processing apparatus,
wherein the processing apparatus calculates reflection factors $R_x$ and $R_y$ of the liquid-crystal panel respectively in a first state in which a transmission axis of an analyzer is arranged so as to be almost parallel to the incident light polarization direction, and in a second state in which the transmission axis of the analyzer is arranged so as to be almost perpendicular thereto, by using an output signal $I_x$ from the first received light quantity detection device and an output signal $I_y$ from the second received light quantity detection device, the reflection factors $R_x$ and $R_y$ being calculated by using the following equations:

$$I_x = I_0 \cdot R_x + I_{cx}$$

$$I_y = I_0 \cdot R_y + I_{cy}$$

where $I_0$ is a quantity of incident light onto the liquid-crystal panel, $I_{cx}$ and $I_{cy}$ are noise light quantities respectively in the state in which the transmission axis of the analyzer is arranged so as to be almost parallel to the polarization direction of the incident light, and in the state in which the transmission axis of the analyzer is arranged so as to be almost perpendicular thereto, and the reflection factors $R_x$ and $R_y$ are functions of the gap and satisfy the relationship $[R_x + R_y = 1]$, and wherein the processing apparatus detects the gap of the liquid crystal panel based on the calculated reflection factors $R_x$ and $R_y$.

* * * * *

UNITED STATES PATENT AND TRADEMARK OFFICE
CERTIFICATE OF CORRECTION

PATENT NO. : 7,079,245 B2
APPLICATION NO. : 10/016913
DATED : July 18, 2006
INVENTOR(S) : Tetsuyuki Kurata et al.

It is certified that error appears in the above-identified patent and that said Letters Patent is hereby corrected as shown below:

On Title Page

Please add the following under (73) Assignee after "Mitsubishi Denki Kabushiki Kaisha:"

--Meiryo Technica Corporation, Aichi (JP)--

Signed and Sealed this

Twenty-eighth Day of November, 2006

JON W. DUDAS
*Director of the United States Patent and Trademark Office*